Patented Oct. 4, 1949

2,483,885

UNITED STATES PATENT OFFICE 2,483,885

NITROPHENYL ACYL AMIDO ALKANE DIOLS

Harry M. Crooks, Jr., Mildred C. Rebstock, John Controulis, and Quentin R. Bartz, Detroit, Mich., assignors to Parke, Davis & Company, Detroit, Mich., a corporation of Michigan No Drawing. Application February 12, 1949, Serial No. 76,179

9 Claims. (Cl. 260—562)

This application is a continuation-in-part of our copending application Serial No. 15,264, filed March 16, 1948, and the invention relates to new chemical compounds and to chemical methods useful for their synthesis. More particularly, the invention relates to certain organic amino diol derivatives possessing outstanding antibiotic activity.

One of the objects of this invention is to obtain the antibiotic compound, [l]-ψ-1-p-nitrophenyl-2-dichloroacetamidopropane-1,3-diol, on a commercial scale by methods which are relatively inexpensive as compared to microbiological methods ordinarily used for manufacturing other antibiotic compounds.

Another object is to produce a new class of valuable chemical compounds useful for their therapeutic properties and useful also as intermediates in the preparation of other valuable compounds.

A further object is to devise synthetic methods for the preparation of a class of valuable chemical compounds heretofore unknown.

These and other objects are attained as hereinafter more fully set forth.

The class of organic amino diol derivatives with which this invention is concerned may be represented by the formula,

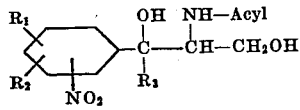

where $R_1$ and $R_2$ are the same or different and represent hydrogen, halogen, lower alkyl and lower alkoxy radicals and $R_3$ is hydrogen or a lower alkyl radical. The term "acyl" as used herein includes saturated and unsaturated lower aliphatic acyl, halogen substituted lower aliphatic acyl, carboxy substituted lower aliphatic acyl, cyano substituted lower aliphatic acyl, ether substituted lower aliphatic acyl, hydroxy substituted lower aliphatic acyl, ester substituted lower aliphatic acyl, benzoyl, substituted benzoyl, araliphatic acyl, furoyl, pyridinoyl and the like radicals.

It will be appreciated by those skilled in the art that the acylamido diols of the invention and the starting materials used in their preparation can exist in structural as well as optical isomeric forms. The term "structural" isomer or form as used herein refers to the cis or trans, that is, the planar relationship of the polar groups on the two asymmetric carbon atoms. To differentiate between these two possible diastereoisomers we will subsequently refer to the cis compounds as the "regular" [reg.] series or form and to the trans diastereoisomers as the "pseudo" [ψ] series or form. Such cis compounds are products wherein the two most highly polar of the groups on the asymmetric carbon atoms lie on the same side of the plane of the two carbon atoms. Conversely, the trans or pseudo compounds are those wherein the two most highly polar groups lie on opposite sides of the plane of the two carbon atoms.

Both the regular and pseudo forms exist as racemates of the optically active dextro [d] and levo [l] rotatary isomers as well as in the form of the individual or separated dextro [d] and levo [l] optical isomers.

Because of the difficulty of representing these structural differences in graphic formulae the customary structural formulae will be used in both the specification and claims and a notation placed below or to the side of the formula to designate the particular structural and optical configuration of the compound. Where the formula represents the unresolved mixture of the structural and optical isomers the notation "unresolved" will be used. However, it should be expressly understood that where no notation appears with a structural formula the formula is to be interpreted in its generic sense, that is, as representing the [l]-ψ, [d]-ψ, [l]-reg. or [d]-reg. isomers in separated form as well as the [dl]-ψ or the [dl]-reg. optical racemates or the total unresolved mixture of structural and optical isomers. Such a formula does not merely represent the unresolved mixture of isomers.

In accordance with the invention several different methods are provided for the production of the acylamido diol compounds of the above formula. One of these methods involves monoacylating an amino diol of formula,

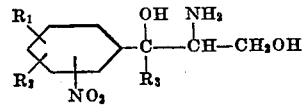

where $R_1$, $R_2$ and $R_3$ have the same significance as given above. Another method by which these products may be obtained comprises selectively hydrolyzing the O-acyl groups of a polyacylated amino diol of formula,

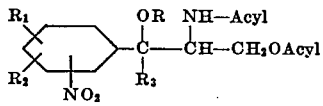

where R is H or an acyl radical and $R_1$, $R_2$ and $R_3$ have the same significance as given above. The acyl groups present in the polyacylated amino diol can be the same or different for, as will be evident from the following description, only the acyl present on the amino nitrogen remains unchanged during the process. These transformations may be diagrammatically illustrated as follows:

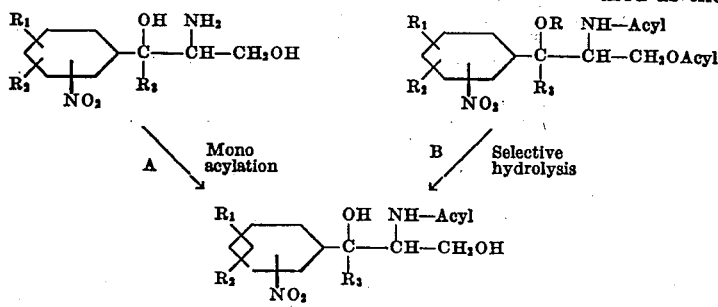

where R, $R_1$, $R_2$ and $R_3$ have the same significance as given above.

In carrying out the reaction designated as A in the above diagram the amino diol is treated with an acylating agent under mild acylating conditions. In order to eliminate the possibility of polyacylation it is preferable to use either an ester type acylating agent under substantially anhydrous conditions, an acyl anhydride or halide under substantially anhydrous conditions at low temperature or an acyl anhydride or halide in a mildly alkaline aqueous reaction medium.

Where an acyl ester is used as the acylating agent the optimum reaction conditions are contingent upon the reactivity of the ester per se and also upon the reactivity of potentially active substituents of the acyl portion of the molecule. Thus for esters of a given acid the lower aliphatic alkyl esters are more reactive than higher alkyls and are therefore the preferred type: The methyl esters being the preferred member of the lower alkyl types. In the case of a highly active ester of the type of methyl dichloroacetate the reaction is substantially complete in periods of one-half to four hours at temperatures varying from 100° C. to 50° C. On the other hand, a relatively inert ester such as methyl benzoate does not react with the amino diol starting materials in practical time intervals so that a catalyst such as an alkali alcoholate is added to accomplish this in a reasonable time. Again, while methyl dichloroacetate reacts when heated with the amino diols to form amides without substantial side reactions a bromine atom of the corresponding methyl dibromoacetate at 100° C. reacts further to form cyclic amide-ethers which are undesirable products. This side reaction is avoided by using a lower reaction temperature, e. g. 40–60° C. in this instance or by use of an inert diluent such as alcohol.

When the acylation is carried out using an acyl anhydride or halide under substantially anhydrous conditions the temperature should be kept below about 15° C. and preferably in the neighborhood of about 0° C. It is also preferable from the standpoint of increased yields and ease in controlling the temperature to carry out the reaction in an inert organic solvent. Some suitable solvents for this purpose are esters of lower fatty acids such as ethyl acetate, lower aliphatic ketones such as acetone and methyl ethyl ketone, cyclic ethers such as dioxane, hydrocarbons such as benzene and toluene, halogenated aliphatic hydrocarbons such as ethylene dichloride and chloroform.

The acylation in an aqueous reaction medium using an acyl halide or anhydride as the acylating agent is effected at a pH greater than 7 and at a temperature below the boiling point of the mixture. Water alone or water together with a water-miscible or water-immiscible organic solvent is used as the reaction medium. In general, water alone is satisfactory in most instances but where the amino diol starting material is quite insoluble it is sometimes advantageous to add a water-miscible organic solvent such as methanol, ethanol and acetone to increase its water solubility and facilitate the reaction. In other instances, however, such as where the acylating agent is quite reactive, it is sometimes preferable to employ a two-phase system in order to minimize the exposure of the final product to the unreacted acylating agent. This is accomplished by carrying out the reaction in a mixture of water and a water immiscible organic solvent such as ethyl acetate, ether, benzene, xylene, chloroform, carbon tetrachloride and the like. Some examples of the alkaline materials which can be used for maintaining the alkalinity of the reaction mixture are the alkali metal acetates, bicarbonates, carbonates, hydroxides and phosphates; the alkaline earth hydroxides and organic bases such as pyridine, N-ethyl morpholine, triethylamine and the like.

Although several different procedures for carrying out the mono N-acylation of the amino diol starting compounds have been described above there are, of course, instances where the use of one method or procedure is preferable. Similarly, the optimal conditions or reagents used in conjunction with one procedure vary somewhat in the individual cases. For example, when an acyl group containing at least one α-halogen is desired on the amino nitrogen atom in the final product the choice of the method of acylation is to some extent dependent upon the reactivity of the halogen atom or atoms. Thus, in the case of the mono-, di- and tri-fluoro- and chloro-acetic acids the halogens are relatively inert and the acylamido diol compounds of the invention may be prepared by any of the methods described above with about equal success. However, where the halogen atoms are more reactive, as in the case of the α-bromo and α-iodo aliphatic acids, the preferred and best method of preparing the corresponding acylamido diol compounds is to react the amino diol with the haloacyl halide in a substantially anhydrous organic solvent such as ethyl acetate.

The transformation designated as B in the above diagram involves selectively hydrolyzing the O-acyl groups present in the polyacylated amino diol compound. This is accomplished by treating the polyacylated amino diol starting compound with a strongly alkaline material dissolved in an aqueous solution containing a water-miscible organic solvent at about −20 to +50° C. Some of the strongly alkaline materials which can be used are the alkali metal hydroxide, the alkaline earth metal hydroxides and the alkali metal carbonates. This transformation can also be effected in a similar manner using a mildly alkaline material such as an alkali metal bicarbonate and heating the mixture at about 75 to 100° C. Suitable organic solvents for use in this reaction are, in general, lower aliphatic alcohols such as methanol, ethanol, isopropanol, isobutanol; lower aliphatic ketones such as acetone, methyl ethyl ketone and cyclic ethers such as dioxane. The preferred method of carrying out this selective hydrolysis is to maintain the temperature in the neighborhood of 25° C. and to use only a slight excess over the amount of strongly alkaline material necessary to bring about hydrolysis of the O-acyl group or groups. When carrying out the reaction in this fashion the solvent of choice is about a 50% aqueous solution of a lower aliphatic alcohol such as methanol or a lower aliphatic ketone such as acetone.

The invention is illustrated by the following examples.

*Example 1*

A mixture consisting of 1.5 g. of the free base of [l]-ψ-1-p-nitrophenyl-2-aminopropane-1,3-diol and 1.5 g. of methyl dichloroacetate is heated at 100° C. for one hour. The reaction mixture is cooled and treated with 25 cc. of petroleum ether. The residue which fails to dissolve is collected, washed with two additional 10 cc. portions of petroleum ether and dried. The product thus obtained is [l]-ψ-1-p-nitrophenyl-2-dichloroacetamidopropane-1,3-diol. This product which has the formula,

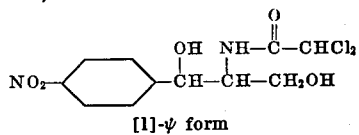

[l]-ψ form can be purified by recrystallization from ethylene dichloride; M. P. 147.5–148.5° C. Repeated recrystallization raises the melting point to about 150–151° C.

*Example 2*

A mixture consisting of 3 g. of the free base of [dl]-ψ-1-p-nitrophenyl-2-aminopropane-1,3-diol and 3 g. of methyl dichloroacetate is heated at about 100° C. for one hour. The reaction mixture is cooled and treated with 50 cc. of petroleum ether. The residue which fails to dissolve is collected, washed with several small portions of petroleum ether and dried. The product thus obtained is [dl]-ψ-1-p-nitrophenyl-2-dichloroacetamidopropane-1,3-diol. It has the formula,

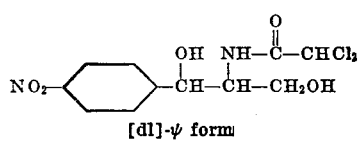

[dl]-ψ form

After recrystallization from ethanol this product melts at 154–5° C.

*Example 3*

500 mg. of the diacetate of [dl]-reg.-1-p-nitrophenyl-2-dichloroacetamidopropane-1,3-diol is dissolved in a mixture consisting of 25 cc. of acetone and an equal volume of 0.2 N sodium hydroxide solution at 0° C. and the mixture allowed to stand for one hour. The reaction mixture is neutralized with hydrochloric acid and evaporated under reduced pressure to dryness. The residue is extracted with several portions of hot ethylene dichloride, the extracts concentrated and then cooled to obtain the crystalline [dl]-reg.-1-p-nitrophenyl-2-dichloroacetamidopropane-1,3-diol; M. P. 171° C. The formula of this compound is:

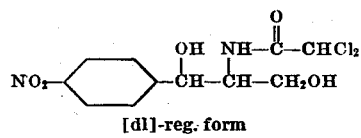

[dl]-reg. form

*Example 4*

A mixture consisting of 75 mg. of [d]-reg.-1-p-nitrophenyl-2-aminopropane-1,3-diol and 0.1 cc. of methyl dibromo-acetate is heated at 60° C. for about one hour, cooled and petroleum ether added to precipitate the desired amide. The solid is collected and purified by recrystallization from ethylene dichloride. This product which has the formula,

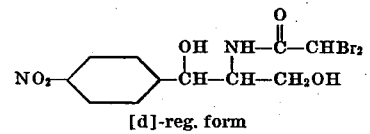

[d]-reg. form is [d]-reg.-1-p-nitrophenyl-2-dibromoacetamidopropane-1,3-diol.

*Example 5*

A two-phase system consisting of 60 cc. of 0.5 N potassium hydroxide solution, an equal volume of ether, 1.06 g. of [l]-ψ-1-p-nitrophenyl-2-aminopropane-1,3-diol and 0.93 g. of p-nitrobenzoyl chloride is shaken at 0° C. for ten minutes. The insoluble product which separates from the reaction mixture is collected, washed with water and purified by recrystallization from alcohol; M. P. 204–5° C. This product is [l]-ψ-1-p-nitrophenyl-2-[p'-nitrobenzamido]propane-1,3-diol which has the formula,

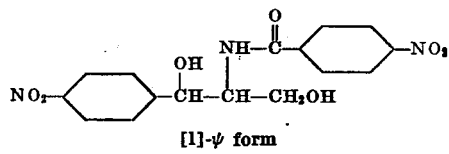

[l]-ψ form

*Example 6*

A two-phase mixture consisting of 50 cc. of 0.5 N potassium hydroxide solution, an equal volume of ethyl acetate, 1.06 g. of [l]-ψ-1-p-nitrophenyl-2-aminopropane-1,3-diol and 1.13 g. of chloroacetyl chloride is shaken for about ten to fifteen minutes at 0° C. The ethyl acetate layer is separated and the aqueous phase extracted with several portions of ethyl acetate. The combined extracts and ethyl acetate layer are evaporated to dryness under reduced pressure and the residual [l]-ψ-1-p-nitrophenyl-2-chloroacetamidopropane-1,3-diol [M. P., crude, 83–6° C.] purified by recrystallization from alcohol-petroleum ether mixture. The formula of this product is:

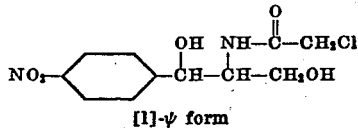

[l]-ψ form

Example 7

A mixture consisting of 1.06 g. of [l]-ψ-1-p-nitrophenyl-2-aminopropane-1,3-diol and 2 g. of methyl trichloracetate is heated at about 100° C. for about one hour, cooled and the 50 cc. of petroleum ether added to the solution. The insoluble material is collected, washed with petroleum ether and purified by recrystallization from ethylene dichloride. This product is [l]-ψ-1-p-nitrophenyl - 2 - trichloroacetamidopropane - 1,3-diol which has the formula,

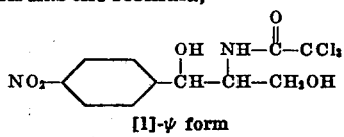

[l]-ψ form

Example 8

A solution of 350 mg. of the triacetyl derivative of [l]-ψ-1-p-nitrophenyl-2-aminopropane-1,3-diol in 17 cc. of acetone is added to 18 cc. of N/10 sodium hydroxide solution at 0° C. After one hour at 0° C. the excess alkali is exactly neutralized with N/10 hydrochloric acid and the solution evaporated to dryness in vacuo. The residue is warmed with ethylene dichloride, filtered to remove salt and the filtrate concentrated to a small volume. Addition of petroleum ether induces crystallization of N-acetyl-[l]-ψ-1-p-nitrophenyl-2-aminopropane-1,3-diol; M. P. 125–6° C. It has the formula:

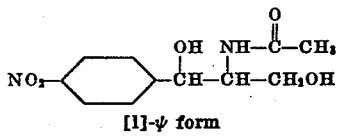

[l]-ψ form

Example 9

2 g. of [d]-reg.-1-p-nitrophenyl-2-aminopropane-1,3-diol is heated at 100° C. with 2 g. of methyl dichloroacetate for one hour, the reaction mixture cooled and extracted with 35 cc. of petroleum ether. The insoluble residue which consists of the desired [d]-reg.-1-p-nitrophenyl-2-dichloroacetamidopropane - 1,3 - diol is washed with petroleum ether and dried. The formula of this product is:

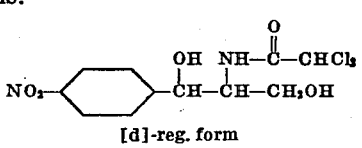

[d]-reg. form

By treating the free base of [l]-reg. 1-p-nitrophenyl - 2 - aminopropane - 1,3 - diol in the same manner one obtains [l]-reg.-1-p-nitrophenyl-2-dichloroacetamidopropane-1,3-diol.

Example 10

350 mg. of [l]-ψ-1-p-nitrophenyl-2-aminopropane-1,3-diol in 2 cc. of methyl difluoroacetate is heated for two and a half hours at 85° C. The reaction mixture is cooled, the product precipitated by the addition of petroleum ether and the precipitate recrystallized from ethylene dichloride to yield the pure [l]-ψ-1-p-nitrophenyl-2-difluoroacetamidopropane-1,3-diol melting at 95° C. The formula of this product is:

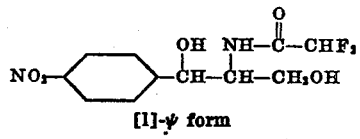

[l]-ψ form

Example 11

500 mg. of [l]-ψ-1-p-nitrophenyl-2-aminopropane-1,3-diol and 1 cc. of propionic anhydride are heated at 70° C. for ten minutes. The reaction mixture is evaporated to dryness in vacuo, the residue taken up in 125 cc. of acetone and treated with 150 cc. of 0.1 N sodium hydroxide for one hour at 0° C. The solution is neutralized with hydrochloric acid, evaporated to dryness in vacuo and the residue extracted with ethyl acetate. The extract is filtered, extracted and then treated with petroleum ether. The [l]-ψ-1-p-nitrophenyl - 2 - propionamidopropane - 1,3 - diol is collected; M. P. 107° C. The formula of this product is:

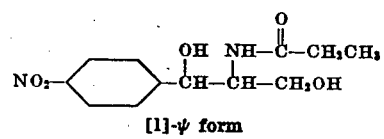

[l]-ψ form

Example 12

200 mg. of [l]-ψ-1-p-nitrophenyl-2-aminopropane-1,3-diol in 5 cc. of absolute ethanol and 3 cc. of ethyl trifluoroacetate is refluxed for two hours. The solvents are evaporated and the residue crystallized from ethyl acetate-chloroform mixture to obtain the pure [l]-ψ-1-p-nitrophenyl-2-trifluoroacetamidopropane-1,3-diol; M. P. 115–16° C. This compound has the formula,

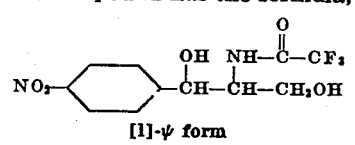

[l]-ψ form

Example 13

A mixture consisting of 400 mg. of [dl]-ψ-1-p-nitrophenyl-2-aminopropane-1,3-diol, 5 cc. of absolute alcohol and 2 cc. of methyl trichloroacetate is refluxed for two hours. The liquids are evaporated in vacuo and the residue crystallized from ethylene dichloride to obtain the desired [dl]-ψ-1 - p - nitrophenyl - 2 - trichloroacetamidopropane-1,3-diol [M. P. 147.5–148.5° C.] of formula,

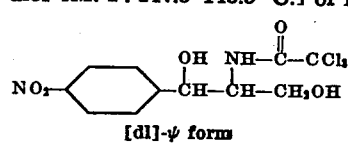

[dl]-ψ form

Example 14

500 mg. of [dl]-reg.-1-p-nitrophenyl-2-aminopropane-1,3-diol is refluxed for six hours with 20 cc. of ethyl acetate. The ethyl acetate is evaporated and the residue which consists of the desired [dl]-reg. 1 - p - nitrophenyl - 2 - acetamidopropane - 1,3 - diol crystallized from ethylene dichloride; M. P. 195–6° C. The formula of this product is:

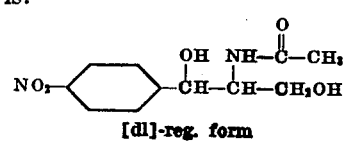

[dl]-reg. form

Example 15

368 mg. of the triacetate of [dl]-ψ-1-p-nitrophenyl-2-aminopropane-1,3-diol is dissolved in 50 cc. of acetone. 50 cc. of 0.1 N sodium hydroxide solution is added and the mixture allowed to stand at 0° C. for one hour. The solution is neutralized with 0.1 N sulfuric acid, evaporated to dryness and the residue extracted with ethyl acetate. The extract is filtered, the ethyl acetate distilled off in vacuo and the residue recrystallized from ethanol to obtain the desired [dl]-ψ-1-p-nitrophenyl-2-acetamidopropane-1,3-diol; M. P. 166.5–167.5° C. The product has the formula

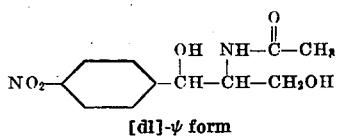

[dl]-ψ form

Example 16

A mixture consisting of 0.57 g. of [d]-ψ-1-p-nitrophenyl-2-aminopropane-1,3-diol and 6 cc. of methyl dichloroacetate is heated at 100° C. for one hour. The solution is diluted with petroleum ether and the precipitate which separates collected. The precipitate is dissolved in ethyl acetate, the solution washed with dilute sulfuric acid, then with water and finally evaporated to dryness in vacuo. Crystallization of the residue from ethylene dichloride yields the pure [d]-ψ-1-p-nitrophenyl-2-dichloroacetamidopropane-1,3-diol; M. P. 150.5–151.5° C. This compound has the following formula

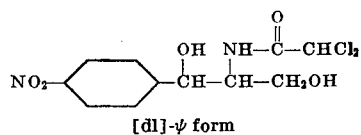

[dl]-ψ form

Example 17

A mixture consisting of 1 g. of [dl]-ψ-1-p-nitrophenyl-2-aminopropane-1,3-diol, 50 cc. of ethyl acetate and 50 cc. of 0.5 N potassium hydroxide solution is treated with 1.5 g. of chloroacetyl chloride at 0° C. with shaking. The organic phase is separated and the aqueous phase extracted with two equal portions of ethyl acetate. The extracts are combined, dried and the ethyl acetate removed by distillation in vacuo. The residual gum is treated with 200 cc. of 0.05 N sodium hydroxide in 50% acetone at 0° C. After about one hour the solution is neutralized with sulfuric acid and evaporated to dryness in vacuo. The residue is extracted with ethyl acetate, the ethyl acetate distilled in vacuo and the residue crystallized from ethylene dichloride. The product thus obtained is [dl]-ψ-1-p-nitrophenyl-2-chloroacetamidopropane-1,3-diol [M. P. 99–100° C.] of formula

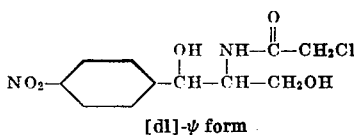

[dl]-ψ form

Example 18

A mixture consisting of 1 g. of [dl]-ψ-1-p-nitrophenyl-2-aminopropane-1,3-diol and 1.5 cc. of isobutyric anhydride is heated on a steam bath for ten minutes. The reaction mixture is chilled and the crystalline [dl]-ψ-1-p-nitrophenyl-2-isobutyramidopropane-1,3-diol collected and purified by recrystallization from ethylene dichloride or ethyl acetate; M. P. 144–5° C. This product has the formula,

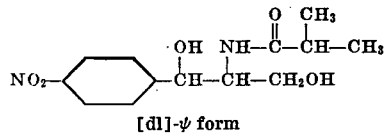

[dl]-ψ form

Example 19

A mixture consisting of 900 mg. of [dl]-ψ-1-p-nitrophenyl-2-aminopropane-1,3-diol and 1.5 cc. of butyric anhydride is heated on a steam bath for five minutes. The reaction mixture is cooled and the crystalline [dl]-ψ-1-p-nitrophenyl-2-butyramidopropane-1,3-diol collected. This product melts at 129.5–130.5° C. after recrystallization from either ethylene dichloride or ethyl acetate. It has the formula,

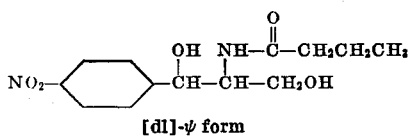

[dl]-ψ form

Example 20

1.5 cc. of [dl]-ψ-α-chloropropionyl chloride is added to a mixture consisting of 1 g. of [dl]-ψ-1-p-nitrophenyl-2-aminopropane-1,3-diol, 50 cc. of ethyl acetate and 50 cc. of 0.5 N potassium hydroxide solution. The mixture is shaken at 0° C. for fifteen minutes and the organic phase separated. The aqueous phase is extracted with two equal volumes of ethyl acetate and the extracts combined with the organic layer. The combined extracts are dried, the ethyl acetate distilled off in vacuo and the residue crystallized from ethylene dichloride to obtain the desired [dl]-ψ-1-p-nitrophenyl-2-α-chloropropionamidopropane-1,3-diol; M. P. 133–5° C. This compound has the formula:

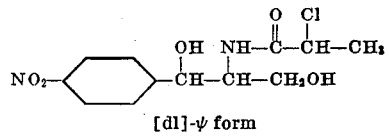

[dl]-ψ form

Example 21

900 mg. of [dl]-ψ-1-p-nitrophenyl-2-aminopropane-1,3-diol is treated with 1½ cc. of 2-ethyl butyryl chloride. The reaction is carried out in a mixture consisting of 50 cc. of ethyl acetate and 50 cc. of 0.5 N potassium hydroxide solution and at a temperature of 0° C. with shaking. The organic layer is separated, the aqueous phase extracted with two portions of ethyl acetate and the extracts combined with the organic layer. The combined extracts are dried, the ethyl acetate distilled in vacuo and the residue treated with 200 cc. of 0.05 N sodium hydroxide in 50% acetone. The solution is neutralized with sulfuric acid, evaporated to dryness in vacuo and the residue extracted with ethyl acetate. The ethyl acetate is distilled and the residue recrystallized from ethylene dichloride to obtain the desired [dl]-ψ-1-p-nitrophenyl-2-α-ethylbutyramidopropane-1,3-diol; M. P. 127–128° C. This product has the formula:

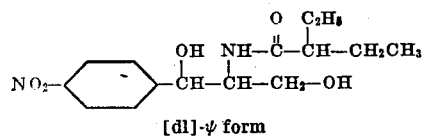

[dl]-ψ form

Example 22

500 mg. of [dl]-ψ-1-p-nitrophenyl-2-aminopropane-1,3-diol is refluxed with a mixture consisting of 3 cc. of absolute alcohol and 2 cc. of ethyl-α,α,β-trichloropropionate. After two hours the ethanol is removed by distillation and petroleum ether added to the residue. The insoluble gum thus obtained is dissolved in ethyl acetate, washed with dilute sulfuric acid, the ethyl acetate extract dried and the ethyl acetate distilled. The residue is recrystallized from ethylene dichloride to obtain the desired [dl]-ψ-1-p-nitrophenyl-2-α,α,β-trichloropropionamidopropane-1,3-diol; M. P. 89–91° C. The formula of this product is:

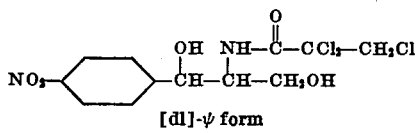

[dl]-ψ form

Example 23

900 mg. of [dl]-ψ-1-p-nitrophenyl-2-aminopropane-1,3-diol in 50 cc. of ethyl acetate and 50 cc. of 0.5 N potassium hydroxide solution is treated with 1 cc. of β-chloropropionyl chloride at 0° C. with shaking. The organic layer is separated, the aqueous phase extracted with two portions of ethyl acetate and the extracts combined with the organic layer. The combined extracts are dried, the ethyl acetate removed by distillation and the residue treated with 200 cc. of 0.05 N sodium hydroxide in 50% acetone. After about one-half hour the solution is neutralized with hydrochloric acid and evaporated to dryness. The residue is extracted with ethyl acetate, the ethyl acetate evaporated and the product crystallized from a mixture consisting of ethylene dichloride and ethyl acetate. The product thus obtained is [dl]-ψ-1-p-nitrophenyl-2-β-chloropropionamidopropane-1,3-diol [M. P. 140–41° C.] which has the formula,

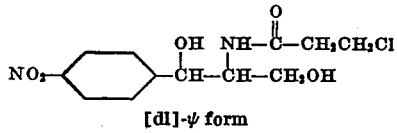

[dl]-ψ form

Example 24

1 cc. of isovaleryl chloride is added to a mixture consisting of 900 mg. of [dl]-ψ-1-p-nitrophenyl-2-aminopropane-1,3-diol in 50 cc. of ethyl acetate and 50 cc. of 0.5 N sodium hydroxide solution. The mixture is shaken at 0° C. for a short time, the organic phase separated and the aqueous layer extracted twice with ethyl acetate. The extracts are combined, dried and the ethyl acetate distilled. The residual gum is treated with 200 cc. of 0.05 N potassium hydroxide in 50% methanol at 0° C. After about one-half hour the solution is neutralized with sulfuric acid and evaporated to dryness. The crystalline material thus obtained is recrystallized from ethylene dichloride and from ethyl acetate to obtain the pure [dl]-ψ-1-p-nitrophenyl-2-isovaleramidopropane-1,3-diol; M. P. 125–6° C. This compound has the formula,

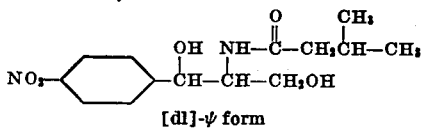

[dl]-ψ form

Example 25

A mixture consisting of 900 mg. of [dl]-ψ-1-p-nitrophenyl-2-aminopropane-1,3-diol in 50 cc. of ethyl acetate and 50 cc. of 0.5 N potassium hydroxide solution is treated with 1.2 cc. of trimethylacetyl chloride at 0° C. with shaking. After a short time the organic layer is separated, the aqueous phase extracted with two portions of ethyl acetate and the extracts combined with the organic layer. The extracts are dried, the ethyl acetate distilled and the residue treated with 200 cc. of 0.05 N sodium hydroxide in 50% acetone. After about one-half hour the solution is neutralized with hydrochloric acid and evaporated to dryness. The residue is extracted with ethyl acetate, the ethyl acetate distilled and the residual product recrystallized from ethylene dichloride and then from a mixture of ethyl acetate and petroleum ether. The product thus obtained is [dl]-ψ-1-p-nitrophenyl-2-trimethylacetamidopropane-1,3-diol which has the formula,

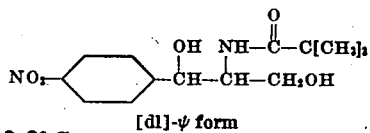

[dl]-ψ form

M. P. 112–3° C.

Example 26

A mixture consisting of 1 g. of [dl]-ψ-1-p-nitrophenyl-2-aminopropane-1,3-diol, 3 cc. of ethyl α,α-dichloropropionate and 3 cc. of ethanol is heated for one and a half hours on a steam bath. The reaction mixture is evaporated to dryness in vacuo and the residue leached with petroleum ether. The undissolved material is dissolved in ethyl acetate, the solution washed with dilute hydrochloric acid and then evaporated to dryness. Recrystallization from ethylene dichloride gives the desired [dl]-ψ-1-p-nitrophenyl-α,α-dichloropropionamidopropane-1,3-diol; M. P. 119–20° C. The formula of this compound is:

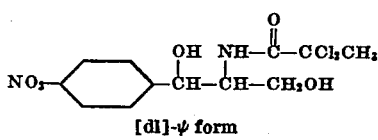

[dl]-ψ form

Example 27

A mixture consisting of 800 mg. of [dl]-ψ-1-p-nitrophenyl-2-aminopropane-1,3-diol, 3 cc. of methyl dibromoacetate and 5 cc. of absolute ethanol is refluxed for one hour and then the liquids removed by distillation. The gummy residue is dissolved in ethyl acetate, the ethyl acetate solution washed with dilute hydrochloric acid, dried and evaporated to dryness. The residual gum is crystallized from ether-petroleum ether mixture and from acetone-petroleum ether mixture, ethyl acetate-petroleum ether mixture and finally from ethylene dichloride. The pure [dl]-ψ-1-p-nitrophenyl-2-dibromoacetamidopropane-1,3-diol of formula,

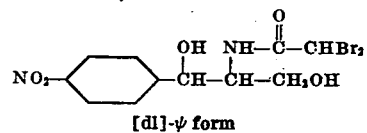

[dl]-ψ form thus obtained melts at 150–1° C.

Example 28

1 g. of [dl]-ψ-1-p-nitrophenyl-2-aminopropane-1,3-diol dissolved in 15 cc. of dry ethyl acetate at 0° C. is treated with 0.5 cc. of bromoacetyl bromide over a five-minute period. After the mixture has been allowed to stand for fifteen minutes 35 cc. of ethyl acetate is added. The solution is washed with dilute acid, 2% sodium bicarbonate solution and finally with water. Evaporation of the ethyl acetate gives a gum which is crystallized from ethylene dichloride, then from ethyl acetate-petroleum ether mixture and finally from water to obtain the desired [dl]-ψ-1-p-nitrophenyl - 2 - bromoacetamidopropane-1,3-diol; M. P. 128–9° C. This product has the formula,

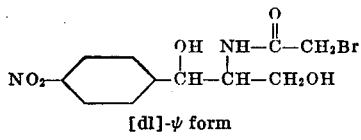

[dl]-ψ form

*Example 29*

0.5 cc. of α,β-dibromopropionyl bromide is added to a mixture consisting of 1 g. of [dl]-ψ-1-p-nitrophenyl - 2 - aminopropane-1,3-diol and 15 cc. of ethyl acetate at 0° C. The reaction mixture is evaporated to dryness, the residue dissolved in ethyl acetate and the solution washed with dilute hydrochloric acid. The ethyl acetate is distilled and the residue crystallized from ethylene dichloride. The product thus obtained is [dl] - ψ-1-p-nitrophenyl-2-α,β - dibromopropionamidopropane-1,3-diol which melts at 155–7° C. and has the formula,

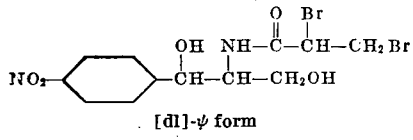

[dl]-ψ form

*Example 30*

0.5 cc. of α,β-dichloropropionyl chloride is added to a mixture consisting of 1 g. of [dl]-ψ-1-p-nitrophenyl-2-aminopropane-1,3-diol in 15 cc. of dry ethyl acetate at 0° C. After about fifteen minutes 35 cc. of ethyl acetate is added and the solution washed with dilute acid, 2% sodium bicarbonate solution and finally with water. The ethyl acetate is removed by distillation and the product crystallized from ethylene dichloride, ethyl acetate-petroleum ether mixture and finally with water. The compound thus obtained is [dl] - ψ-1-p-nitrophenyl-2-α,β - dichloropropionamidopropane-1,3-diol [M. P. 145–6° C.] which has the formula,

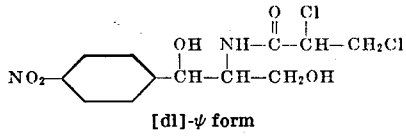

[dl]-ψ form

*Example 31*

2 g. of [dl]-ψ-1-p-nitrophenyl-2-aminopropane-1,3-diol in 15 cc. of ethyl acetate at 0° C. is treated with 1 cc. of fluoroacetyl chloride. After a few minutes 35 cc. more of ethyl acetate is added and the solution then washed with dilute acid, 2% sodium bicarbonate solution and finally with water. The solution is evaporated to dryness and the residue crystallized from ethylene dichloride, ethyl acetate-petroleum ether mixture and finally from water to obtain the desired [dl]-ψ-1-p-nitrophenyl - 2 - fluoroacetamidopropane-1,3-diol; M. P. 65–7° C. This compound has the formula,

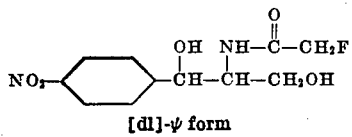

[dl]-ψ form

*Example 32*

1 cc. of β-chloropropionyl chloride is added to 2 g. of [dl]-ψ-1-p-nitrophenyl-2-aminopropane-1,3-diol in 20 cc. of ethyl acetate. The resulting mixture is stirred at 0° C. for fifteen minutes, 35 cc. of ethyl acetate added and then the solution washed with dilute acid, 2% sodium bicarbonate solution and finally with water. The ethyl acetate solution is evaporated to dryness and the residue recrystallized from ethyl acetate to obtain the desired [dl]-ψ-1-p-nitrophenyl - 2 - β-chloropropionamidopropane - 1,3 - diol; M. P. 155–6° C. This produce has the formula,

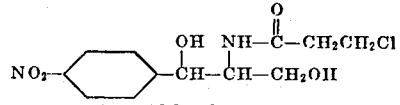

[dl]-ψ form

*Example 33*

0.6 cc. of iodoacetyl chloride is added to a mixture consisting of 1 g. of [dl]-ψ-1-p-nitrophenyl-2-aminopropane-1,3-diol and 20 cc. of ethyl acetate. The resulting mixture is stirred at 0° C. for fifteen minutes and then diluted with ethyl acetate. The solution is washed with dilute hydrochloric acid, 2% sodium bicarbonate solution and finally with water. The ethyl acetate is evaporated and the residue recrystallized from ethyl acetate to obtain the desired [dl]-ψ-1-p-nitrophenyl - 2 - iodoacetamidopropane-1,3-diol; M. P. 138–9° C. This product has the formula,

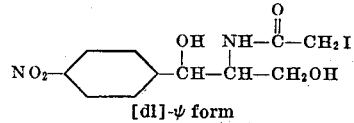

[dl]-ψ form

*Example 34*

1 g. of [dl]-ψ-1-p-nitrophenyl - 2 - aminopropane-1,3-diol in 20 cc. of ethyl acetate is treated with 1 g. of 3,4-dichlorobenzoyl chloride and the resulting mixture stirred at 0° C. for fifteen minutes. The reaction mixture is diluted with ethyl acetate, washed with dilute hydrochloric acid, then with sodium bicarbonate solution and finally with water. The ethyl acetate is removed by distillation and the residue crystallized from ethylene dichloride, ethanol - petroleum ether mixture and finally from ethylene dichloride to obtain the desired [dl]-ψ-1-p-nitrophenyl-2-[3',4'-dichlorobenzamido]propane - 1,3-diol; M. P. 149–51° C. This compound has the formula,

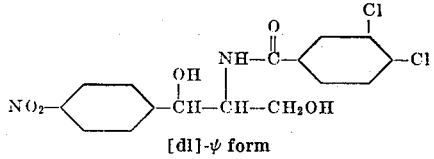

[dl]-ψ form

*Example 35*

1 g. of succinic anhydride is added to 2.12 g. of [dl]-ψ-1-p-nitrophenyl - 2-aminopropane-1,3-diol in 20 cc. of water and the mixture heated for thirty minutes. The reaction mixture is allowed to stand overnight at 25° C. and the crystalline [dl]-ψ-1-p-nitrophenyl - 2-β-carboxypropionamidopropane-1,3-diol [M. P. 178–9° C.] collected. This product which has the formula,

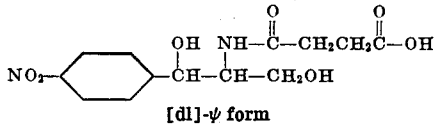

[dl]-ψ form may be purified if desired by recrystallization from water.

This compound may also be prepared by dissolving 2.12 g. of [dl]-ψ-1-p-nitrophenyl-2-aminopropane-1,3-diol in a mixture consisting of 3 cc. of pyridine per gram and 0.4 g. per gram of succinic anhydride. The mixture is allowed to stand overnight, the solution diluted with 10 volumes of 1 N hydrochloric acid and the precipitated product collected and purified by recrystallization from water.

Example 36

0.08 g. of sodium dissolved in methyl alcohol is added to a mixture consisting of 1 g. of [l]-ψ-1-p-nitrophenyl-2-aminopropane-1,3-diol and 5 g. of methyl benzoate in 20 cc. of methanol and the mixture heated on a steam bath for twenty minutes. The solution is diluted with 3 volumes of 1 N hydrochloric acid and the oily precipitate which solidifies collected and purified by recrystallization from ethyl acetate. The product thus obtained is [l]-ψ-1-p-nitrophenyl-2-benzamidopropane-1,3-diol which has the formula,

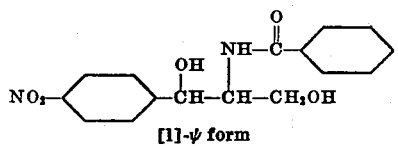

[l]-ψ form and melts at 167–9° C.

Example 37

2.2 g. of [l]-ψ-1-o-methyl-p-nitrophenyl-2-aminopropane-1,3-diol is mixed with 1.75 g. of methyl dichloroacetate and the mixture heated at 100° C. for one and a half hours. The reaction mixture is cooled, extracted with two 25 cc. portions of petroleum ether and the residue which fails to dissolve collected. The residue which consists of [l]-ψ-1-o-methyl-p-nitrophenyl-2-dichloroacetamidopropane-1,3-diol is washed with two additional 10 cc. portions of petroleum ether and purified by recrystallization from ethylene dichloride. Its formula is:

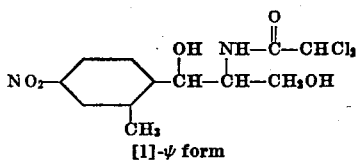

[l]-ψ form

By similar treatment of the free base of [d]-ψ-1-o-methyl-p-nitrophenyl-2-aminopropane-1,3-diol with methyl dichloroacetate, one obtains [d]-ψ-1-o-methyl-p-nitrophenyl-2-dichloroacetamidopropane-1,3-diol.

Example 38

1.2 g. of the free base of [d]-reg.-1-o-methyl-p-nitrophenyl-2-aminopropane-1,3-diol is heated at 100° C. for one and a half hours with 1.3 g. of methyl dichloroacetate. The residue is extracted twice with a small amount of petroleum ether, the extracts discarded and the residue consisting of [d]-reg.-1-o-methyl-p-nitrophenyl-2-dichloroacetamidopropane-1,3-diol collected. The product is washed with petroleum ether and purified by recrystallization from ethylene dichloride. It has the formula:

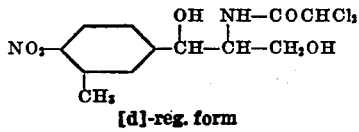

[d]-reg. form

By treating the free base of [l]-reg.-1-o-methyl-p-nitrophenyl-2-aminopropane in a similar manner one obtains [l]-reg.-1-o-methyl-p-nitrophenyl-2-dichloroacetamidopropane-1,3-diol.

Example 39

A mixture consisting of 1.2 g. of [dl]-ψ-1-m-methoxy-p-nitrophenyl-2-aminopropane-1,3-diol and 1 g. of methyl dichloroacetate is heated at 100° C. for one hour and a half. The residue is cooled, extracted with two 25 cc. portions of petroleum ether and the material which fails to dissolve collected. This crystalline material which consists of [dl]-ψ-1-m-methoxy-p-nitrophenyl-2-dichloroacetamidopropane-1,3-diol of formula,

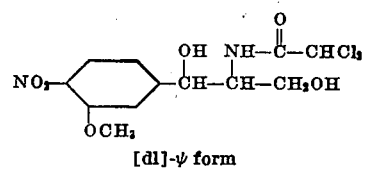

[dl]-ψ form is washed with two 10 cc. portions of petroleum ether, dried and then purified by recrystallization from ethylene dichloride.

Example 40

0.75 g. of the [l]-ψ-1-m-methoxy-p-nitrophenyl-2-aminopropane-1,3-diol is converted to the corresponding 2-dichloroacetamido derivative of formula,

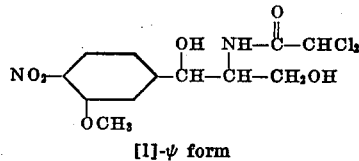

[l]-ψ form by heating with 0.6 g. of methyl dichloroacetate at 100° C. for one and a half hours followed by leaching the impurities out of the residual product with petroleum ether. The insoluble product can then be purified further, if desired, by recrystallization from ethylene dichloride.

Example 41

A mixture consisting of 4 g. of [dl]-reg.-1-m-methoxy-p-nitrophenyl-2-aminopropane-1,3-diol and 3.3 g. of methyl dichloroacetate is heated at 100° C. for about two hours, cooled and the residue washed well with petroleum ether. The undissolved residue which consists of [dl]-reg.-1-m-methoxy-p-nitrophenyl-2-dichloroacetamidopropane-1,3-diol of formula,

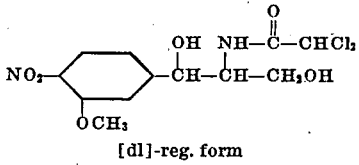

[dl]-reg. form is collected and purified by recrystallization from ethylene dichloride.

Example 42

4 g. of [dl]-reg.-1-[2'-nitro-4',5'-dimethylphenyl]-2-aminopropane-1,3-diol is heated at 100° C. for one and a half hours with 3.2 g. of methyl dichloroacetate. The residue is cooled, washed with several portions of petroleum ether and purified by recrystallization from ethylene dichloride. The product thus obtained is [dl]-reg.-

1-[2'-nitro-4',5'-dimethylphenyl]-2-dichloroacetamidopropane-1,3-diol of formula,

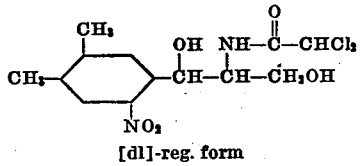

[dl]-reg. form

*Example 43*

A mixture consisting of 2 g. of [dl]-ψ-2-amino-3-p-nitrophenylbutane-1,3-diol and 1.7 g. of methyl dichloroacetate is heated at 100° C. for about two hours and the reaction mixture cooled. The solid product is extracted with petroleum ether and the material which fails to dissolve collected. This insoluble product consists of [dl]-ψ-2-dichloroacetamido-3-p-nitrophenylbutane-1,3-diol. This compound, whose formula is,

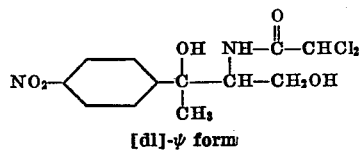

[dl]-ψ form can be purified by recrystallization from ethylene dichloride.

*Example 44*

About 4 g. of unresolved 1-[2'-chloro-5'-nitrophenyl]-2-aminopropane-1,3-diol is heated with 4.5 g. of methyl dichloroacetate at 100° C. for two hours. The reaction mixture is cooled, treated with 75 cc. of petroleum ether and the insoluble product collected. The crude 1-[2'-chloro-5'-nitrophenyl]-2-dichloroacetamidopropane-1,3-diol is washed with several more portions of petroleum ether and purified further, if desired, by recrystallization from ethylene dichloride. The formula of this product is:

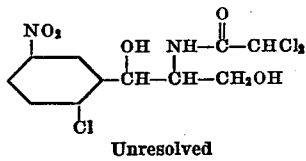

Unresolved

*Example 45*

.054 g. of sodium methoxide is added to an absolute alcohol solution containing 2.12 g. of [dl]-ψ-1-p-nitrophenyl-2-aminopropane-1,3-diol and 2.05 g. of ethyl phenylacetate and the mixture heated under reflux for one-half hour. The solution is neutralized by the addition of 1 cc. of 1 N hydrochloric acid and the methanol evaporated. The residue is taken up in ethylene dichloride, filtered to remove the sodium chloride and the filtrate concentrated to the point of crystallization. The [dl]-ψ-1-p-nitrophenyl-2-phenylacetamidopropane-1,3-diol which separates on cooling is collected and dried. This product has the formula,

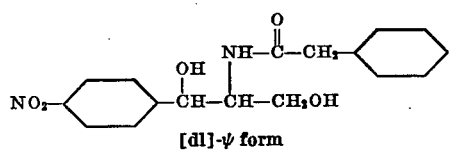

[dl]-ψ form

*Example 46*

1.7 g. of phenylacetyl chloride is added with stirring to a mixture consisting of 2.12 g. of [dl]-ψ-1-p-nitrophenyl-2-aminopropane-1,3-diol, 50 cc. of ethyl acetate, 50 cc. of water and 5 g. of calcium carbonate. During the addition the mixture is maintained at about 0° C. The reaction mixture is stirred for one hour, the layers separated and the ethyl acetate phase filtered from the excess calcium carbonate. The ethyl acetate solution is evaporated to dryness and the residue recrystallized from ethylene dichloride to obtain the desired [dl]-ψ-1-p-nitrophenyl-2-phenylacetamidopropane-1,3-diol. This product is identical with that obtained by the process described in Example 45.

*Example 47*

110 cc. of 0.1 N sodium hydroxide solution is added to a solution of 2.83 g. of [dl]-ψ-1-p-nitrophenyl-2-phenylacetamido-1,3-diphenylacetoxypropane in 100 cc. of acetone and the resulting mixture allowed to stand at room temperature for two hours. The reaction mixture is neutralized with dilute hydrochloric acid and the acetone evaporated in vacuo. Crystallization of the precipitated solid from ethylene dichloride yields the desired [dl]-ψ-1-p-nitrophenyl-2-phenylacetamidopropane-1,3-diol. This product has the formula given in Example 45 and is identical with the product obtained in Examples 45 and 46.

*Example 48*

.054 g. of sodium methoxide is added to a solution consisting of 2.26 g. of [dl]-ψ-1-[m-methyl-p-nitrophenyl]-2-aminopropane-1,3-diol and 2.05 g. of ethyl p-methylbenzoate in 50 cc. of methanol and the resulting mixture heated under reflux for one-half hour. 1 cc. of 1 N hydrochloric acid is added and the reaction mixture evaporated to dryness in vacuo. The residue is crystallized from dilute methanol and then from ethylene dichloride to yield the pure [dl]-ψ-1-[m-methyl-p-nitrophenyl]-2-p'-methylbenzamidopropane-1,3-diol which has the formula

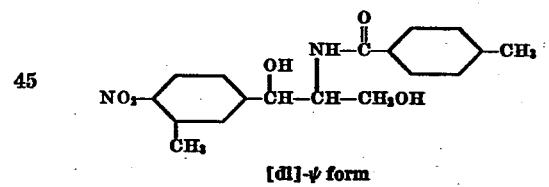

[dl]-ψ form

*Example 49*

A solution of 2.9 g. of the tri-p-methylbenzoate of [dl]-ψ-1-[m-methyl-p-nitrophenyl]-2-aminopropane-1,3-diol in 110 cc. of acetone is diluted with 110 cc. of 0.1 N sodium hydroxide solution and the mixture allowed to stand at room temperature for three hours. The excess alkali is neutralized with dilute hydrochloric acid and the acetone evaporated in vacuo. The residue is collected and purified by recrystallization from ethylene dichloride to obtain the desired [dl]-ψ-1-[m-methyl-p-nitrophenyl]-2-p'-methylbenzamidopropane-1,3-diol. This product is identical with the product obtained in Example 48.

*Example 50*

A mixture consisting of 5.57 g. of the tribenzoate of [dl]-reg.-1-[m-methoxy-p-nitrophenyl]-2-aminopropane-1,3-diol, 220 cc. of 0.1 N sodium hydroxide solution and 200 cc. of acetone is allowed to stand at 50° C. for one hour. The excess alkali is neutralized with dilute hydrochloric acid, the acetone evaporated and the crystalline product collected and recrystallized from ethyl acetate. The product thus obtained is [dl]-reg.-

1-[m-methoxy-p-nitrophenyl]-2-benzamidopropane-1,3-diol which has the formula

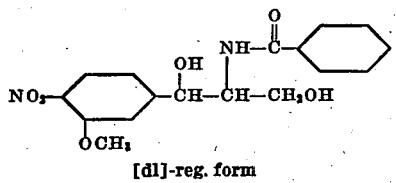

[dl]-reg. form

Example 51

2.42 g. of [dl] - reg.-1-[m-methoxy-p-nitrophenyl]-2-aminopropane-1,3-diol is shaken with 50 cc. of 0.33 N sodium hydroxide solution and 1.7 g. of p-methylbenzoyl chloride added in small portions with shaking. After the odor of the benzoyl chloride has disappeared the product is collected and recrystallized from ethyl acetate. This compound is [dl]-reg.-1-[m-methoxy-p-nitrophenyl]-2-p'-methylbenzamidopropane-1,3 - diol of formula

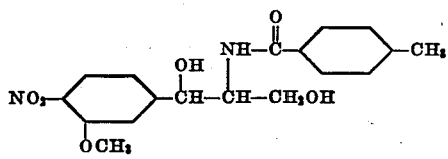

[dl]-reg. form

Example 52

A solution of 2.42 g. of [dl]-reg.-1-[m-methoxy - p-nitrophenyl]-2-aminopropane-1,3-diol in 250 cc. of dry ethyl acetate is treated at 0° C. with 1.4 g. of p-methylbenzoyl chloride. After standing for about one hour the solution is extracted with two 50 cc. portions of water and the ethyl acetate concentrated to a volume of 20 cc. whereupon the desired [dl]-reg.-1-[m-methoxy-p-nitrophenyl] - 2-p'-methylbenzamidopropane-1,3-diol crystallizes from the cooled solution. This product is identical with that obtained by the method of Example 51.

Example 53

.054 g. of sodium methoxide is added to a solution consisting of 2.12 g. of [dl]-ψ-1-p-nitrophenyl-2-aminopropane-1,3-diol and 2 g. of ethyl lactate in 50 cc. of dry methanol. The mixture is refluxed for one-half hour, 1 cc. of 1 N hydrochloric acid added and the methanol removed by distillation. The residue is taken up in hot ethyl acetate, the extract filtered to remove the sodium chloride and the filtrate chilled. The crystalline product is collected and dried. The product thus obtained is [dl]-ψ-1-p-nitrophenyl-2-lactamidopropane-1,3-diol which has the formula

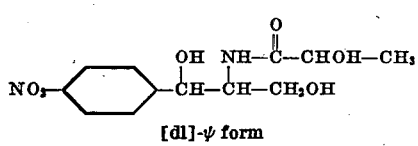

[dl]-ψ form

Example 54

A solution consisting of 2.12 g. of [dl]-ψ-1-p-nitrophenyl-2-aminopropane - 1,3 - diol, 1.5 g. of ethyl cyanoacetate, .054 g. of sodium methoxide and 50 cc. of dry methanol is heated under reflux for one-half hour. 1 cc. of 1 N hydrochloric acid is added, the methanol evaporated and the residue diluted with 25 cc. of .1 N hydrochloric acid. The oily layer is separated and induced to crystallize from ethylene dichloride to obtain the desired [dl] - ψ-1-p-nitrophenyl-2-cyanacetamidopropane-1,3-diol of formula

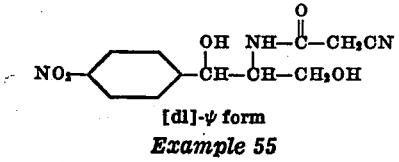

[dl]-ψ form

Example 55

1.48 g. of phthalic anhydride is added to a solution consisting of 2.26 g. of [dl]-ψ-3-p-nitrophenyl-2-aminobutane-1,3-diol in 10 cc. of dry pyridine and the resulting solution heated for one hour on a steam bath. The solution is cooled, diluted with 10 volumes of 0.1 N hydrochloric acid and the precipitated product collected. The precipitate which consists of the desired [dl]-ψ-3-p-nitrophenyl-2-phthalamidobutane-1,3-diol is purified by crystallization from acetone. This product has the formula

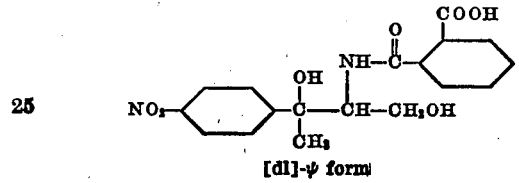

[dl]-ψ form

Example 56

.054 g. of sodium methoxide is added to a solution consisting of 2.12 g. of [dl]-ψ-1-p-nitrophenyl-2-aminopropane-1,3-diol and 2.5 g. of ethyl-β,β-dimethylacrylate in 50 cc. of dry methanol and the mixture warmed for one-half hour. The alkali is neutralized with 1 cc. of 1 N hydrochloric acid and the methanol evaporated. The residue which consists of sodium chloride and the desired product is extracted with ethylene dichloride, the extracts filtered and the desired compound crystallized from the filtrates. Recrystallization from water yields the pure [dl]-ψ-1-p-nitrophenyl-2-β,β - dimethylacrylamidopropane-1,3-diol of formula,

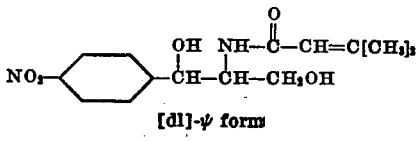

[dl]-ψ form

Example 57

2.32 g. of [l]-menthoxyacetyl chloride is added to a solution of 2.12 g. of [d]-ψ-1-p-nitrophenyl-2-aminopropane-1,3-diol in 150 cc. of ethyl acetate at 0° C. and the solution allowed to warm with stirring. After one hour the solution is extracted with two 50 cc. portions of water and the ethyl acetate layer separated and dried. The ethyl acetate is removed by distillation and the residue crystallized from ethylene dichloride. The product thus obtained is the N-[l]-menthoxy acetyl derivative of [d]-ψ-1-p-nitrophenyl-2-aminopropane-1,3-diol; M. P. 171-2° C. This compound has the formula,

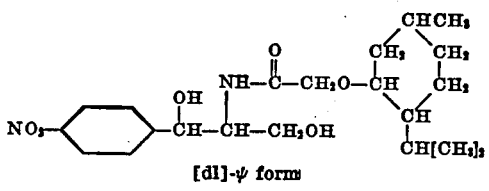

[dl]-ψ form

Example 58

2.32 g. of [l]-menthoxy acetyl chloride is added to a solution of 2.12 g. of [l]-ψ-1-p-nitrophenyl- 2-aminopropane-1,3-diol in 150 cc. of dry ethyl acetate at 0° C. After one hour the solution is extracted with two 50 cc. portions of water and the ethyl acetate layers separated and dried. The ethyl acetate is removed by distillation until a volume of 20 cc. is reached. The residue is cooled and the crystalline N-[l]-menthoxy acetyl derivative of [l]-ψ-1-p-nitrophenyl-2-aminopropane-1,3-diol which separates from the solution collected and dried; M.P. about 160° C. This product is the optical antipode of the compound of Example 57.

*Example 59*

1.7 g. of benzoyl chloride is added in small portions to a well-shaken suspension of 2.4 g. of [dl]-reg.-1-[2'-nitro-4',5'-dimethylphenyl] - 2 - aminopropane- 1,3-diol in 50 cc. of .33 N sodium hydroxide solution. After the mixture has been allowed to stand for one hour the precipitate is collected and washed with 30 cc. of 0.1 N hydrochloric acid. The product thus obtained is [dl]-reg.-1-[2'-nitro-4',5'-dimethylphenyl]-2- benzamidopropane-1,3-diol of formula,

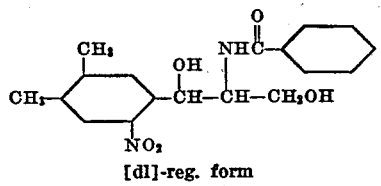

[dl]-reg. form and can be purified by recrystallization from ethyl acetate.

*Example 60*

1.4 g. of benzoyl chloride is added to a solution of 2.4 g. of [dl]-reg.-1-[2'-nitro-4',5'-dimethylphenyl]-2-aminopropane-1,3-diol in 150 cc. of dry ethyl acetate at 0° C. and the mixture stirred for one hour. The solution is washed with water, then with sodium bicarbonate solution and finally with water again. The ethyl acetate extract is dried, concentrated to a volume of 15 cc. and cooled. The product thus obtained is [dl]-reg.-1-[2'-nitro-4',5'-dimethylphenyl] - 2 - benzamidopropane-1,3-diol. This compound is identical with the product of Example 59.

*Example 61*

A solution consisting of 3.86 g. of the triacetate of [dl]-reg.-3-[2'-chloro-5'-nitrophenyl]-2-aminobutane-1,3-diol in 250 cc. of acetone is diluted with 220 cc. of 0.1 N sodium hydroxide solution. The mixture is allowed to stand for one hour at 0° C., the alkali neutralized with dilute hydrochloric acid and the acetone evaporated in vacuo. The precipitate is collected from the aqueous residue and recrystallized from ethyl acetate. This compound is [dl]-reg.-3-[2'-chloro-5'-nitrophenyl]-2-acetamidobutane-1,3-diol of formula,

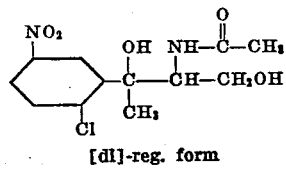

[dl]-reg. form

*Example 62*

1 g. of acetic anhydride is added slowly to a solution of 2.6 g. of [dl]-reg.-3-[2'-chloro-5'-nitrophenyl]-2-aminobutane-1,3-diol in 5% sodium acetate solution at 10° C. After the odor of anhydride has disappeared the solution is extracted with 4 volumes of ethyl acetate and the combined extracts washed with dilute hydrochloric acid and then with water. The ethyl acetate extract is dried and the ethyl acetate evaporated to a small volume and the product allowed to crystallize. This compound is [dl]-reg.-3-[2'-chloro-5'-nitrophenyl]-2-acetamidobutane - 1,3-diol. It is identical with the product prepared by the method described in Example 61.

*Example 63*

1.5 g. of [dl]-ψ-1-p-nitrophenyl-2-aminopropane-1,3-diol in 30 cc. of ethyl acetate is treated with 1 cc. of pure furoyl chloride at 0° C. After one-half hour water is added, the ethyl acetate layer separated, washed with dilute acid, then with sodium bicarbonate solution and finally with water. The ethyl acetate is removed by distillation in vacuo and the residue crystallized from water to obtain the desired [dl]-ψ-1-p-nitrophenyl-2-furamidopropane-1,3-diol; M. P. 136° C. This product has the formula,

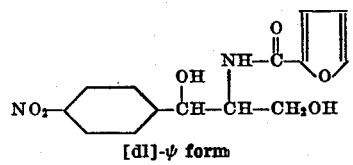

[dl]-ψ form

*Example 64*

1 g. of [l]-ψ-1-p-nitrophenyl-2-aminopropane-1,3-diol is heated under reflux for one hour with 3.5 cc. of methyldibromoacetate and 5 cc. of absolute ethanol. The reaction mixture is evaporated to dryness in vacuo, the residue dissolved in ethyl acetate, the ethyl acetate extract washed with dilute hydrochloric acid, then with sodium bicarbonate solution and finally with water. The extract is dried, the ethyl acetate distilled and the residue recrystallized from acetone-petroleum ether mixture. Final purification is accomplished by recrystallization from ethylene dichloride. The product thus obtained is [l]-ψ-1-p-nitrophenyl- 2 -dibromoacetamidopropane-1,3-diol of formula,

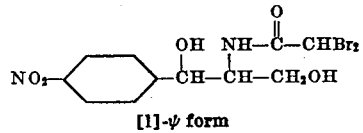

[l]-ψ form

*Example 65*

0.6 g. of methoxyacetyl chloride is added to a solution of 2.12 g. of [dl]-ψ-1-p-nitrophenyl-2-aminopropane-1,3-diol in 25 cc. of ethyl acetate at 0° C. After thirty minutes the reaction mixture is washed with 5 cc. of water, 5 cc. of saturated sodium bicarbonate solution and then with a fresh portion of water. The ethyl acetate layer is dried, concentrated to a volume of about 4 cc. and diluted with petroleum ether until the solution becomes cloudy. The solution is allowed to stand in the refrigerator and the crystalline [dl]-ψ-1-p-nitrophenyl-2-methoxyacetamidopropane-1,3-diol collected. This product has the formula,

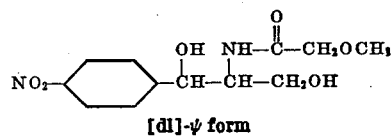

[dl]-ψ form

Example 66

A mixture consisting of 2.12 g. of [l]-ψ-1-p-nitrophenyl-2-aminopropane-1,3-diol, 1 cc. of a 5% solution of sodium methoxide in methanol and 2 g. of methyl nicotinate in 30 cc. of methanol is refluxed for one hour. The alkali is neutralized with 1 cc. of 1 N hydrochloric acid, the methanol evaporated and the residue crystallized from hot water. The product thus obtained is [l]-ψ-1-p-nitrophenyl - 2 - nicotinamidopropane-1,3-diol of formula,

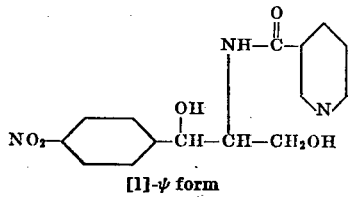

[l]-ψ form

Example 67

0.8 cc. of acetyllactoyl chloride is added to 2.12 g. of [dl]-ψ-1-p-nitrophenyl-2-aminopropane-1,3-diol in 25 cc. of dry ethyl acetate at 10° C. The reaction mixture is allowed to stand for one hour, washed with water, then with saturated sodium bicarbonate solution and finally with water. The ethyl acetate solution is dried and the ethyl acetate evaporated. Crystallization of the residue from ethyl acetate-petroleum ether mixture yields the desired [dl]-ψ-1-p-nitrophenyl-2-acetyllactamidopropane-1,3-diol which has the formula,

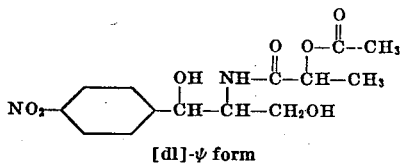

[dl]-ψ form

The above sixty-seven examples are illustrative of many of the new chemical compounds of this invention. One of the most important is the compound, [l] - ψ -1-p-nitrophenyl - 2 - dichloroacetamidopropane-1,3-diol, disclosed in Example 1, which has been given the name, chloramphenicol. It is a particularly valuable antibiotic which may also be prepared by microbiological methods as described in the copending application of Bartz Serial No. 15,265, filed March 16, 1948. Chloramphenicol has the formula,

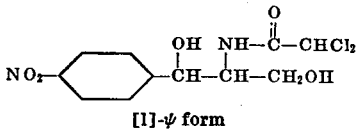

[l]-ψ form

Chloramphenicol

Chloramphenicol, whether produced by chemical synthesis or microbiological methods has the following characteristic properties. It has the empirical formula $C_{11}H_{12}O_5N_2Cl_2$ and a molecular weight of 323.1. It contains, by analysis, 41.0% carbon, 3.74% hydrogen, 8.64% nitrogen and 21.7% chlorine. Its optical rotation, $[\alpha]_D^{25}$, is −25.5° in ethyl acetate and +18° in ethanol. It is a solid and is obtained as colorless needles or elongated plates melting at 150–151° C. (uncorrected). The compound is further characterized by the fact that it exhibits a λmax. at 278mμ and a $E^{1\%}_{1\,cm}$ of 312 (0.1 NHCl) on ultra violet adsorption spectrum analysis. It is soluble in distilled water at room temperature to the extent of about 2.5 mg./cc. It is relatively insoluble in cold 5% sodium bicarbonate but dissolves slowly in 5% sodium hydroxide. It can be recrystallized from water or from organic solvents or solvent mixtures such as methylene dichloride, ethylene dichloride and ether-petroleum ether mixture. It is soluble in a wide variety of organic solvents and may be extracted from aqueous solutions by many of the more water-immiscible organic solvents. For example, it is soluble in and may be extracted from aqueous solutions with cyclohexanone, methyl isobutyl ketone, n-butanol, ethyl acetate, nitrobenzene, nitromethane and ether. However, this compound is practically insoluble in aromatic and aliphatic hydrocarbons such as benzene, toluene, pentane and petroleum ether.

In contrast to most of the known antibiotic substances, chloramphenicol possesses a remarkable degree of stability to heat, acids and alkalis. For example, it has been found that it may be heated in distilled water at 37° C. for at least a month or at 100° C. for about five hours without any significant loss of its antibiotic activity. Under similar conditions such well-known antibiotics as penicillin, streptothricin and streptomycin are completely inactivated. The compound is stable in aqueous solutions within the pH range of 0.4 to about 10 for at least twenty-four hours at room temperature. Tests have shown it to be much more stable in acidic aqueous solutions than streptomycin, one of the most stable of the known antibiotics. For example, streptomycin is 90% inactivated within twenty-four hours by 1 N hydrochloric acid at room temperature whereas this product, under the same conditions, retains its full antibiotic potency.

Chloramphenicol, (l)-ψ-1-p - nitrophenyl-2-dichloracetamidopropane-1,3-diol, is strongly active bacteriostatically against gram negative bacteria as well as against both the acid fast and non-acid fast types of gram positive bacteria. It is also effective against the micro-organism responsible for typhus fever, i. e. *Rickettsia prowazeki*. Some examples of the gram positive bacteria against which it is effective are: *Staphylococcus aureus, Streptococcus haemolyticus, Bacillus subtilis* and *Mycobacterium tuberculosis*. Among the many gram negative bacteria against which the compound exhibits its bacteriostatic action are such bacteria as *Escherichia coli, Salmonella schottmuelleri, Klebsiella pneumoniae* and *Shigella paradysenteriae* (Sonne). In general, the bacteriostatic activity of this new antibiotic is similar to that of streptomycin but in some instances, notably in the case of *Shigella paradysenteriae*, it is much more active than streptomycin. It, in general, is more effective against gram negative bacteria than against gram positive bacteria.

The toxicity of chloramphenicol is much less than that of such well-known antibiotics as tyrothricin, actinomycin, clavacin and the like but about the same as that of streptomycin.

Chloramphenicol has been found to give therapeutic blood levels when administered by either the parenteral or oral routes. The fact that it exerts its beneficial effect when administered orally is surprising in view of the fact that at the present time penicillin is almost the only antibiotic which gives therapeutic blood levels on oral administration. Even in this case the destruction of the penicillin by the digestive fluids renders it necessary to administer approximately hree to four times the intramuscular quantity of penicillin in order to obtain therapeutic blood levels. The antibiotics which are most effective against gram negative bacteria, such as streptomycin, are completely inactive when administered orally due to the fact that they are not absorbed from the intestinal tract. Thus it will be appreciated that chloramphenicol is the first antibiotic exhibiting a high degree of activity against gram negative bacteria which is therapeutically effective upon oral administration. The usual oral or parenteral dosage of chloramphenicol in the treatment of urinary or gastrointestinal tract infections is one to ten grams daily depending, of course, upon the type and extent of the infection.

In the foregoing examples we have employed a certain new class of organic amino diols and their polyacylated derivatives as starting materials. These starting materials can be prepared in a number of different ways. One of the general methods which can be used to prepare these amino diols and their polyacylated derivatives is that represented by the following diagram.

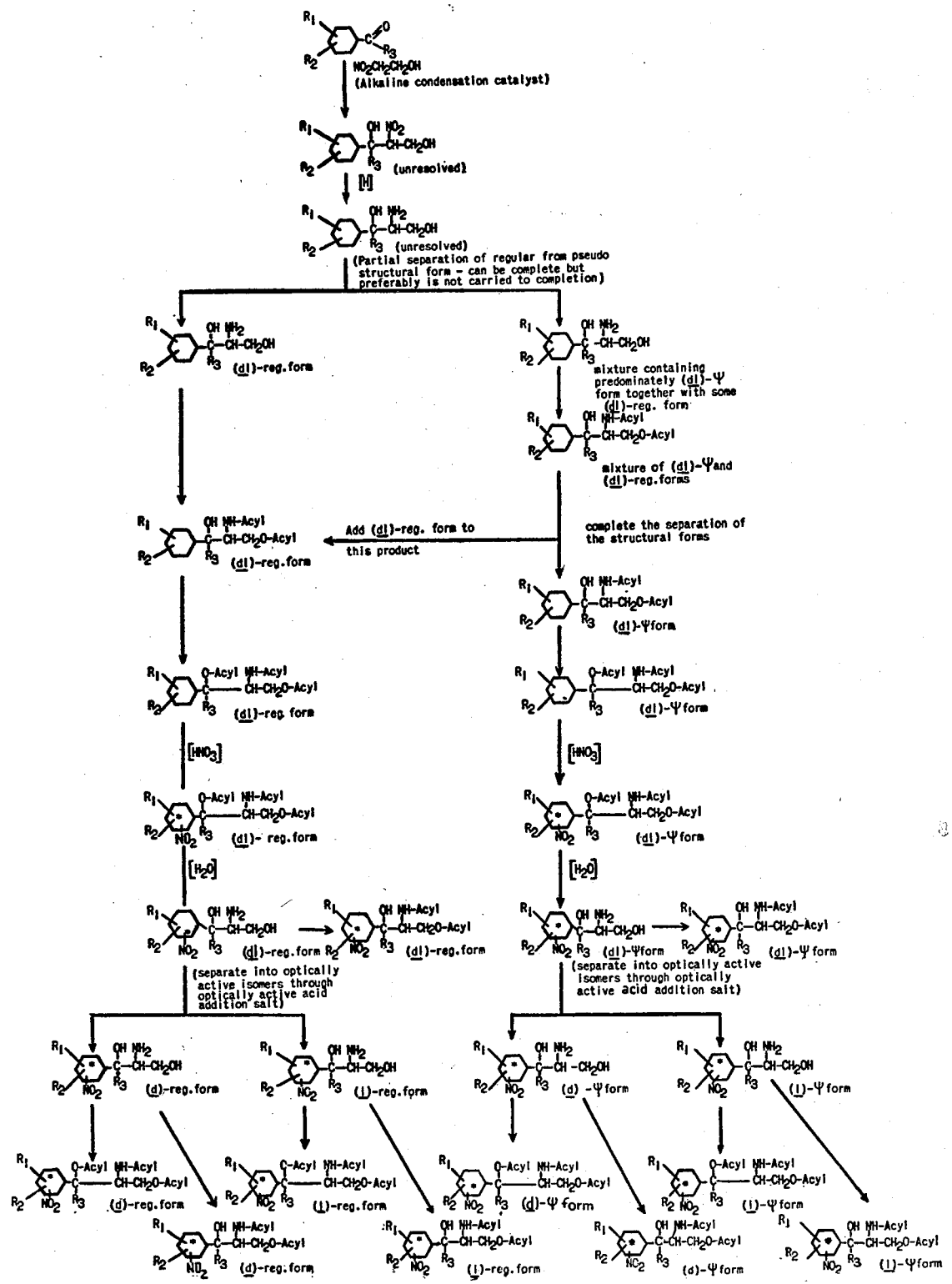

where $R_1$, $R_2$ and $R_3$ have the same significance as given above. The starting materials used in the practice of the invention are marked with an asterisk in the phenyl ring. The preparation of the unresolved starting materials has not been shown on the above diagram but these products may be prepared by the indicated processes by omitting the steps of separating the structural and optical isomers. Many of the processes and products depicted in the above diagram and disclosed but not claimed herein are described and claimed in our copending applications Serial Nos. 76,172; 76,173; 76,174; 76,175; 76,176; 76,177; 76,178; and 76,180, all filed Feb. 12, 1949 on even date herewith, as continuations in part of our parent application Ser. No. 15,264.

The following examples serve to illustrate the application of this general method to the preparation of some of the specific starting materials used in the foregoing examples.

Example 68

1.1 g. of sodium is dissolved in 20 cc. of methanol and the resulting solution added to a solution of 5 g. of benzaldehyde and 4.5 g. of β-nitroethanol in 20 cc. of methanol. After standing at room temperature for a short time the gel which forms on the mixing of the reactants changes to a white insoluble powder. The precipitate is collected, washed with methanol and ether and then dried. The product thus produced is the sodium salt of 1 - phenyl - 2 - nitropropane-1,3-diol. If desired, the free nitrodiol having the formula,

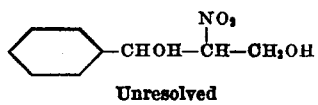

Unresolved can be obtained by acidification of the salt.

20 g. of the sodium salt of 1-phenyl-2-nitropropane-1,3-diol [prepared by the above method] is dissolved in 200 cc. of glacial acetic acid. 0.75 g. of palladium oxide hydrogenation catalyst is added and the mixture shaken with hydrogen under three atmospheres pressure for about twelve hours. The catalyst is removed by filtration, the filtrate concentrated to about one-tenth volume in vacuo and diluted with five volumes of water. The solution is extracted with one volume of ethyl acetate or ether and the extract discarded. The aqueous phase is made alkaline to pH 12 with strong sodium hydroxide solution and extracted with five 100 cc. portions of ethyl acetate. The combined extracts are dried, the ethyl acetate evaporated and the residue recrystallized from chloroform. The white crystalline product thus obtained is [dl]-reg.-1-phenyl-2-aminopropane-1,3-diol [M. P. 103–4° C.] of formula,

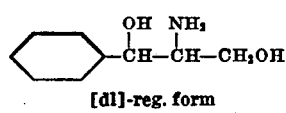

[dl]-reg. form

The chloroform filtrate from the crystallization of the [dl]-reg.-1-phenyl-2-aminopropane-1,3-diol is evaporated to dryness and the residue heated with an excess of acetic anhydride at 70° C. for fifteen minutes. The reaction mixture is evaporated to dryness in vacuo and the residue recrystallized from ethanol. This white crystalline product which melts at 167–8° C. is [dl]-ψ-1 - phenyl - 2 - acetamido-3-acetoxypropane-1-ol. It can be represented by the following formula,

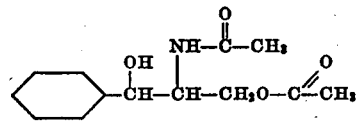

[dl]-ψ form 2 g. of [dl]-ψ-1-phenyl-2-acetamido-3-acetoxypropane-1-ol is added to a mixture composed of 4 cc. of acetic anhydride and 4 cc. of dry pyridine and the resulting mixture heated at 100° C. for about one-half hour. The reaction mixture is evaporated in vacuo and the residue recrystallized from methanol to obtain the triacetate of [dl]-ψ-1-phenyl-2-aminopropane-1,3-diol melting at 79° C. Its formula is:

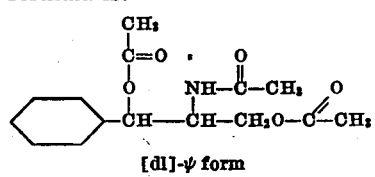

[dl]-ψ form 2 g. of the triacetate of [dl]-ψ-1-phenyl-2-aminopropane-1,3-diol is added in small portions to a mixture composed of 2.5 cc. of concentrated nitric acid and 2.5 cc. of concentrated sulfuric acid. The temperature of the nitrating mixture is maintained at about 0° C. and the reaction continued until solution of the amino diol derivative is complete. The reaction mixture is poured onto 250 g. of ice and the resulting solution extracted with several portions of ethyl acetate. After washing with sodium carbonate solution the ethyl acetate is distilled from the combined extracts in vacuo and the residual triacetate of [dl]-ψ-1-p-nitrophenyl-2-aminopropane-1,3-diol purified by recrystallization from ethanol. This product which melts at 145° C. has the formula,

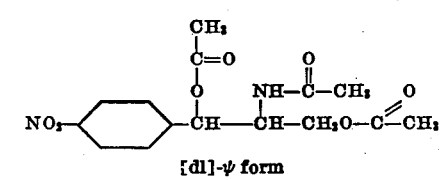

[dl]-ψ form 2 g. of the triacetate of [dl]-ψ-1-p-nitrophenyl-2-aminopropane-1,3-diol is heated with 100 cc. of 5% hydrochloric acid for two to three hours on a steam bath and then the reaction mixture evaporated to dryness in vacuo. The crystalline hydrochloride salt of [dl]-ψ-1-p-nitrophenyl-2-aminopropane-1,3-diol [M. P. 177.5–8.5° C.] thus obtained is taken up in a small amount of water and the solution made alkaline to pH 9 with sodium hydroxide solution. The solution is extracted with ethyl acetate, the combined extracts dried and the ethyl acetate evaporated to obtain the desired free base of [dl]-ψ-1-p-nitrophenyl-2-aminopropane-1,3-diol; M. P. 140.5° C. The formula of this compound is:

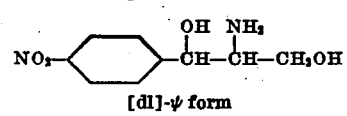

[dl]-ψ form

The [dl]-ψ-1-p-nitrophenyl-2-aminopropane-1,3-diol prepared above is dissolved in a small amount of water and treated with an aqueous solution containing an equivalent amount of [d]-tartaric acid. The solution is evaporated to dryness in vacuo and the residue fractionally crystallized from the minimum amount of hot methanol. The first isomer to separate from the solution in crystalline form is the [d]-tartaric acid salt of

[l]-ψ-1-p-nitrophenyl-2-aminopropane-1,3 - diol; M. P. 198–200° C. [d]-tartaric acid salt of [d]-ψ-1-p-nitrophenyl-2-aminopropane-1,3-diol is recovered from the filtrates after removal of the salt of the [l]-isomer.

The [d]-tartaric acid salt of [l]-ψ-1-p-nitrophenyl-2-aminopropane-1,3-diol obtained above is dissolved in water, the solution made alkaline to pH 9 with sodium hydroxide solution and extracted with several portions of ethyl acetate. The combined ethyl acetate extracts are dried and the ethyl acetate evaporated to obtain the free base of [l]-ψ-1-p-nitrophenyl - 2 - aminopropane-1,3-diol [M. P. 157° C.] having the formula,

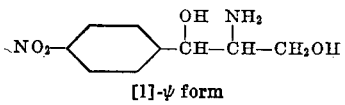

[l]-ψ form

By decomposing the [d]-tartaric acid salt of [d]-ψ-1-p-nitrophenyl-2-aminopropane - 1,3-diol in the same manner as described above for the [l]-isomer, one obtains the free base of [d]-ψ-1-p-nitrophenyl-2-aminopropane-1,3-diol. In an analogous manner the [dl]-ψ-1-p-nitrophenyl-2-aminopropane-1,3-diol may be resolved into its isomeric forms via the [d]-camphor sulfonic acid salt. This is accomplished by reacting the optically active acid with the racemic base in butanol or isopropanol and separating the isomers by recrystallization from n-butanol or isopropanol. The salt of the [l] isomer which separates from the solution first has an M. P. of 172° C.

3 g. of [dl]-ψ-1-p-nitrophenyl-2-aminopropane-1,3-diol is heated with 10 cc. of acetic anhydride at 70° C. for fifteen minutes and then the reaction mixture evaporated to dryness in vacuo. Recrystallization of the residue from ethanol yields the desired [dl]-ψ-1-p-nitrophenyl-2-acetamido-3-acetoxypropane-1-ol of formula,

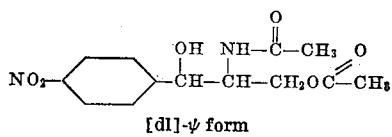

[dl]-ψ form in pure form.

1 g. of [l]-ψ-1-p-nitrophenyl-2-aminopropane-1,3-diol is mixed with 3 cc. of acetic anhydride and the mixture heated on a steam bath at 70° C. for about fifteen minutes. The reaction mixture is evaporated to dryness in vacuo and the residue recrystallized from methanol to obtain the desired [l]-ψ-1-p-nitrophenyl - 2 - acetamido-3-acetoxypropane-1-ol of formula,

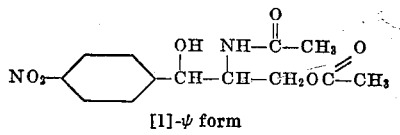

[l]-ψ form

By substituting [d]-ψ-1-p-nitrophenyl-2-aminopropane-1,3-diol for the [l]-ψ-isomer used in the above procedure one obtains [d]-ψ-1-p-nitrophenyl-2-acetamido-3-acetoxypropane-1-ol.

2 g. of [l]-ψ-1-p-nitrophenyl-2-aminopropane-1,3-diol is added to a mixture composed of 4 cc. of acetic anhydride and 4 cc. of dry pyridine and the resulting mixture heated at 100° C. for about one-half hour. The reaction mixture is evaporated to dryness in vacuo and the residue recrystallized from methanol to obtain the desired triacetate of [l]-ψ-1-p-nitrophenyl-2-aminopropane-1,3-diol. This product has the formula,

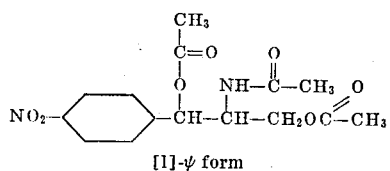

[l]-ψ form

By employing the corresponding [d]-ψ isomer in the above procedure one obtains the triacetate of [d]-ψ-1-p-nitrophenyl-2-aminopropane - 1,3-diol.

Example 69

10 g. of [dl]-reg.-1-phenyl-2-aminopropane-1,3-diol, prepared as described in Example 68, is heated with a mixture consisting of 20 cc. of pyridine and 20 cc. of acetic anhydride for one-half hour at 100° C. The reaction mixture is evaporated to dryness in vacuo to obtain the desired triacetate of [dl]-reg.-1-phenyl-2-aminopropane-1,3-diol. This same compound can also be obtained by first diacylating the [dl]-reg.-1-phenyl-2-aminopropane-1,3-diol on the amino and terminal hydroxyl groups with acetic anhydride and then subsequently O-acylating the [dl]-reg.-1-phenyl-2-acetamido-3-acetoxypropane-1-ol so obtained with acetic anhydride and pyridine.

10 g. of the triacetate of [dl]-reg.-1-phenyl-2-aminopropane-1,3-diol is added in small portions to a mixture composed of 12.5 cc. of concentrated nitric acid and 12.5 cc. of concentrated sulfuric acid at 0° C. After the addition has been completed the temperature is maintained at 0° C. until solution is complete and then the reaction mixture poured onto 1250 g. of ice. The solution is extracted with several portions of ethyl acetate, the ethyl acetate extracts washed with dilute sodium carbonate solution and the ethyl acetate removed by distillation in vacuo. The residue which consists of the triacetate of [dl]-reg.-1-p-nitrophenyl-2-aminopropane-1,3-diol is purified by recrystallization from ethanol.

8 g. of the triacetate of [dl]-reg.-1-p-nitrophenyl-2-amino-propane-1,3-diol is heated with 400 cc. of 5% hydrochloric acid for about three hours and the reaction mixture evaporated to dryness in vacuo. The residual [dl]-reg.-1-p-nitrophenyl-2-aminopropane-1,3-diol hydrochloride is taken up in a small amount of water, the solution made alkaline to pH 9 with sodium hydroxide solution and the mixture extracted with ethyl acetate. The combined extracts are dried and the ethyl acetate removed by distillation in vacuo to obtain the desired [dl]-reg.-1-p-nitrophenyl-2-aminopropane-1,3-diol.

5 g. of [dl]-reg.-1-p-nitrophenyl-2-aminopropane-1,3-diol is dissolved in water and treated with an equivalent amount of [d]-tartaric acid. The reaction mixture is evaporated to dryness and the mixture of the [d]-tartaric acid salts of the [d] and [l] forms of reg.-1-p-nitrophenyl-2-aminopropane-1,3-diol separated by fractional crystallization.

The [d]-tartaric acid salt of [d]-reg.-1-p-nitrophenyl-2-aminopropane-1,3-diol is dissolved in water, the solution made alkaline to pH 9 with sodium hydroxide solution and extracted with ethyl acetate. The extracts are dried and the ethyl acetate distilled to obtain the free base of [d]-reg.-1-p-nitrophenyl - 2 - aminopropane-1,3-diol.

In a similar manner, the free base of [l]-reg.-1-p-nitrophenyl-2-aminopropane-1,3-diol may be obtained by decomposing the corresponding [d]-tartaric acid salt with sodium hydroxide.

4 g. of [dl]-reg.-1-p-nitrophenyl-2-aminopropane-1,3-diol is added to 15 cc. of acetic anhydride and the mixture heated at 65–70° C. for fifteen minutes. The reaction mixture is evaporated to dryness in vacuo and the residue recrystallized from ethanol to obtain the desired [dl]-reg.-1-p-nitrophenyl - 2 - acetamido-3-acetoxypropane-1-ol of formula,

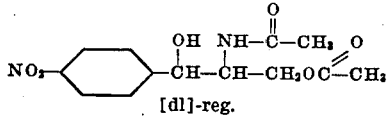

[dl]-reg.

In a similar manner by employing the individual [d]- and [l]-reg. isomers in the above procedure one obtains [d]-reg.-1-p-nitrophenyl-2-acetamido-3-acetoxypropane-1-ol and [l]-reg.-1-p-nitrophenyl-2 - acetamido - 3 - acetoxypropane-1-ol, respectively.

2 g. of [d]-reg.-1-p-nitrophenyl-2-aminopropane-1,3-diol is added to a mixture composed of 4 cc. of acetic anhydride and 4 cc. pyridine and the resulting mixture heated at 100° C. for about one-half hour. The reaction mixture is evaporated to dryness in vacuo and the residue recrystallized from ethanol to obtain the desired triacetate of [d]-reg.-1-p-nitrophenyl-2-aminopropane-1,3-diol of formula,

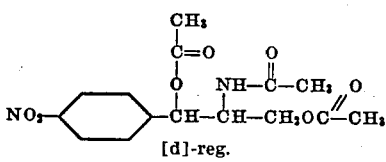

[d]-reg.

Use of the [l]-reg. isomer in the foregoing procedure results in the production of the triacetate of [l]-reg.-1-p-nitrophenyl-2-aminopropane-1,3-diol.

*Example 70*

1.7 g. of [dl]-reg.-1-phenyl-2-aminopropane-1,3-diol is treated with 1.6 g. of methyl dichloroacetate and the mixture heated at 100° C. for one and a quarter hours. The residue is washed with two 20 cc. portions of petroleum ether and the insoluble product collected. Recrystallization from ethyl acetate yields the desired [dl]-reg-1-phenyl-2-dichloroacetamidopropane - 1,3-diol in pure form; M. P. 154–6° C. This product has the formula:

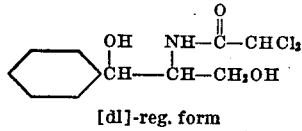

[dl]-reg. form 500 mg. of [dl]-reg.-1-phenyl-2-dichloroacetamidopropane-1,3-diol is added to a solution consisting of 1 cc. of pyridine and 1 cc. of acetic anhydride and the resulting reaction mixture heated at 100° C. for one-half hour. The reaction mixture is evaporated to dryness under reduced pressure and the residue taken up in and crystallized from methanol. Recrystallization from methanol produces the pure diacetate of [dl]-reg.-1-phenyl - 2 - dichloroacetamidopropane-1,3-diol [M. P. 94° C.] having the formula,

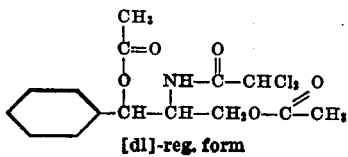

[dl]-reg. form 200 mg. of the diacetate of [dl]-reg.-1-phenyl-2-dichloro-acetamidopropane-1,3-diol is added to a mixture consisting of 0.25 cc. of concentrated nitric acid and 0.25 cc. of concentrated sulfuric acid at 0° C. The reaction mixture is stirred until solution is complete, poured onto 25 g. of ice and the mixture extracted with ethyl acetate. The ethyl acetate extracts are evaporated under reduced pressure and the diacetate of [dl]-reg.-1-p-nitrophenyl - 2 - dichloroacetamidopropane-1,3-diol so produced purified by recrystallization from ethanol; M. P. 134° C. This compound has the following formula,

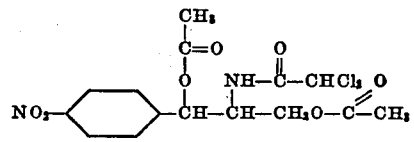

[dl]-reg. form

*Example 71*

2.2 g. of sodium dissolved in 40 cc. of methanol is added to a solution of 12 g. of o-methyl benzaldehyde and 9 g. of β-nitroethanol in 40 cc. of methanol. The reaction mixture is allowed to stand at room temperature for a short time and then the white insoluble sodium salt of 1-o-methylphenyl-2-nitropropane-1,3-diol removed by filtration, washed with ether and dried. Acidification of this sodium salt produces the corresponding free nitro compound, 1-o-methylphenyl-2-nitropropane-1,3-diol, which has the formula,

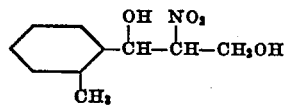

Unresolved 18 g. of the sodium salt of 1-o-methylphenyl-2-nitropropane-1,3-diol is dissolved in 175 cc. of glacial acetic acid, 0.75 g. of palladium oxide hydrogenation catalyst added and the mixture hydrogenated under three atmospheres pressure of hydrogen for about twelve hours. The catalyst is removed by filtration, the filtrate concentrated to a small volume in vacuo and then the residue diluted with five volumes of water. The solution is extracted with one volume of ethyl acetate or ether and the extract discarded. The aqueous phase is made alkaline to pH 12 with strong sodium hydroxide solution and extracted with five volumes of ethyl acetate. The ethyl acetate extracts are combined, dried and the ethyl acetate evaporated in vacuo. The residue which consists of a mixture of the [dl]-reg. and [dl]-ψ-1-o-methylphenyl-2-aminopropane-1,3-diol is taken up in and crystallized from chloroform to obtain the [dl]-reg.-1-o-methylphenyl-2-aminopropane-1,3-diol in crystalline form. Its formula is:

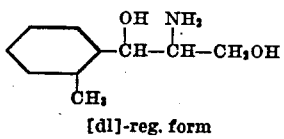

[dl]-reg. form

The chloroform filtrate from which the [dl]-reg.-1-o-methylphenyl -2- aminopropane-1,3-diol has been removed is evaporated in vacuo to obtain the crude [dl]-ψ-1-o-methylphenyl-2-aminopropane-1,3-diol. If desired, the crude [dl]-ψ product can be converted directly to the triacetate by treatment with acetic anhydride and pyridine but we have found it preferable to purify this product through an acyl derivative such as the N-mono acetate or the N, 3-O-diacetate before proceeding further in the synthesis of our new antibiotics. This purification may be carried out as follows:

1. The crude [dl]-ψ-1-o-methylphenyl-2-aminopropane-1,3-diol is treated with an excess of acetyl chloride at about room temperature in a solvent of dry benzene. When a considerable amount of the hydrochloride salt of [dl]-ψ-1-o-methylphenyl-2-aminopropane-1,3-diol has separated from the solution the reaction is stopped by the addition of 300 cc. of water. After thorough mixing the aqueous solution is removed and saved for recovery of the unacetylated amino diol. The benzene solution is washed with dilute sodium bicarbonate solution and then dried. The benzene is removed by distillation in vacuo and the crude [dl]-ψ-1-o-methylphenyl-2-acetamidopropane-1,3-diol taken up in alcohol and purified by recrystallization from alcohol. The formula of this product is:

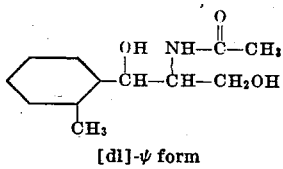

[dl]-ψ form

2. An alternative method for purifying the crude [dl]-ψ-amino diol is as follows:

The crude [dl]-ψ-1-o-methylphenyl-2-aminopropane-1,3-diol is heated with an excess of acetic anhydride at about 70 to 80° C. for fifteen minutes and then the reaction mixture evaporated in vacuo. The residue which consists of [dl]-ψ-1-o-methylphenyl-2-acetamido-3-acetoxypropane-1-ol has the formula:

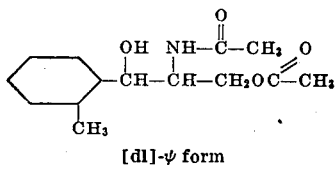

[dl]-ψ form and is purified by recrystallization from ethanol.

5 g. of either [dl]-ψ-1-o-methylphenyl-2-acetamidopropane-1,3-diol or [dl]-ψ-1-o-methylphenyl-2-acetamido-3-acetoxypropane-1-ol is added to a mixture consisting of 10 cc. of acetic anhydride and 10 cc. of pyridine and the resulting mixture heated at 100° C. for about one-half hour. The reaction mixture is concentrated to dryness in vacuo and the residual triacetate of [dl]-ψ-1-o-methylphenyl-2-aminopropane-1,3-diol recrystallized from methanol. The formula of this product is:

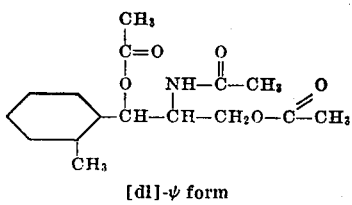

[dl]-ψ form 6 g. of the triacetate of [dl]-ψ-1-o-methylphenyl-2-aminopropane-1,3-diol is added in small portions to a nitrating mixture composed of 7.5 cc. of concentrated nitric and 7.5 cc. of concentrated sulfuric acid while keeping the temperature at about 0° C. The reaction mixture is stirred until solution is complete and then poured onto 750 g. of ice. The solution is extracted with several portions of ethyl acetate, the extracts washed with sodium carbonate solution and the ethyl acetate distilled. The residue which consists principally of the triacetate of [dl]-ψ-1-o-methyl-p-nitrophenyl-2-aminopropane-1,3-diol of formula,

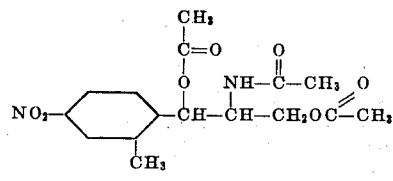

[dl]-ψ form can be purified by recrystallization from ethanol.

5 g. of the triacetate of [dl]-ψ-1-o-methyl-p-nitrophenyl-2-aminopropane-1,3-diol is heated with 250 cc. of 5% hydrochloric acid for about three hours and then the reaction mixture evaporated to dryness in vacuo. The residue which consists of [dl]-ψ-1-o-methyl-p-nitrophenyl-2-aminopropane-1,3-diol hydrochloride is taken up in water, the solution made alkaline to pH 9 with sodium hydroxide and then extracted with several portions of ethyl acetate. The ethyl acetate extracts are dried and the ethyl acetate distilled to obtain the free base of [dl]-ψ-1-o-methyl-p-nitrophenyl-2-aminopropane-1,3-diol which has the formula,

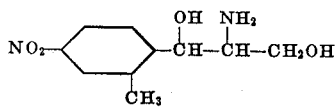

[dl]-ψ form 4 g. of [dl]-ψ-1-o-methyl-p-nitrophenyl-2-aminopropane-1,3-diol is dissolved in a small amount of water and added to an aqueous solution containing an equivalent amount of [d]-tartaric acid. The solution is evaporated to dryness in vacuo and the residue fractionally crystallized from hot methanol. The first isomer to separate from the solution is the [d]-tartaric acid salt of [l]-ψ-1-o-methyl-p-nitrophenyl-2-aminopropane-1,3-diol. After removal of the [d]-acid salt of the [l]-isomer the corresponding [d]-acid salt of the [d]-isomeric diol is recovered from the combined filtrates.

The [d]-tartaric acid salt of [l]-ψ-1-o-methyl-p-nitrophenyl-2-aminopropane-1,3-diol obtained above is dissolved in water and the solution made alkaline to pH 9 with sodium hydroxide. The solution is extracted with ethyl acetate, the extracts dried and the ethyl acetate evaporated to obtain the free base of [l]-ψ-1-o-methyl-p-nitrophenyl-2-aminopropane-1,3-diol. This compound has the formula:

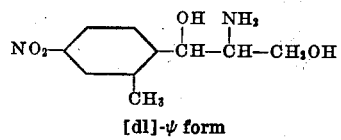

[dl]-ψ form

By neutralization of the [d]-tartaric acid salt of the [d]-ψ-isomer one obtains the free base of [d]-ψ-1-o-methyl-p-nitrophenyl-2-aminopropane-1,3-diol.

By starting with the [dl]-reg.-1-o-methylphenyl-2-aminopropane-1,3-diol and following the procedures described in detail above the corresponding reg. series of starting material is obtained.

Similarly, by utilization of the procedures described in Examples 65 and 66 the diacyloxy and optically active triacyl derivatives used as starting materials are obtained.

Example 72

The starting materials having as the root of their formulae the structure,

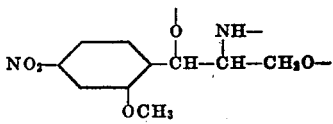

can be obtained by starting with m-methoxybenzaldehyde and β-nitroethanol and applying the procedures described in Examples 68 and 69 above.

Example 73

The starting materials which have as the root of their formulae the structure,

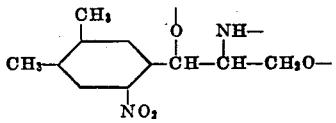

can be prepared by starting with 3,4-dimethylbenzaldehyde and β-nitroethanol and following the procedures described in Examples 68 and 69.

Example 74

The compounds used as starting materials in the preparation of the acylamido diols of formula,

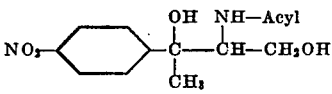

are prepared by starting with acetophenone and β-nitroethanol and following the procedures outlined in detail under Examples 68 and 69.

Example 75

The products used as starting materials having as the root of their formulae the structure,

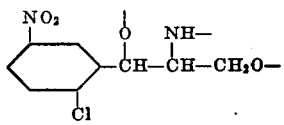

can be prepared from o-chlorobenzaldehyde and β-nitroethanol using the procedures described in Examples 68 and 69. However, the preferred method of reducing the 1-o-chlorophenyl-2-nitropropane-1,3-diol is by the use of stannous acetate or chloride in acetic acid rather than by the catalytic method disclosed in the aforementioned examples.

What we claim is:

1. A compound of the formula,

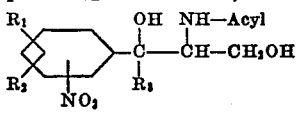

where $R_1$ and $R_2$ are members of the class consisting of hydrogen, halogen, lower alkyl and lower alkoxy radicals and $R_3$ is a member of the class consisting of hydrogen and lower alkyl radicals; said acyl being a carboxylic acid acyl radical.

2. A compound of the formula,

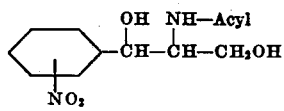

said acyl being a carboxylic acid acyl radical.

3. A compound of the formula,

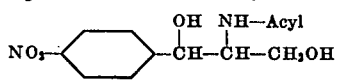

said acyl being a carboxylic acid acyl radical.

4. A compound of the formula,

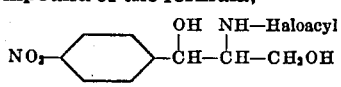

said haloacyl being a halogenated lower aliphatic carboxylic acid acyl radical.

5. A compound of the formula,

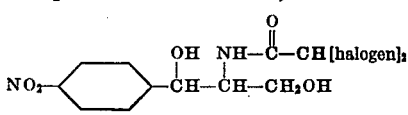

6. The [l]-ψ form of a compound of the formula,

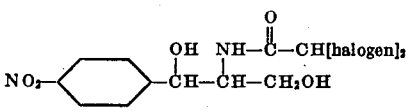

7. [l]-ψ-1-p-nitrophenyl-2-dibromoacetamidopropane-1,3-diol.

8. [dl]-ψ - 1 - p-nitrophenyl - 2 - dichloroacetamidopropane-1,3-diol.

9. [l]-ψ-1-p-nitrophenyl-2-dichloroacetamidopropane-1,3-diol.

HARRY M. CROOKS, JR.
MILDRED C. REBSTOCK.
JOHN CONTROULIS.
QUENTIN R. BARTZ.

REFERENCES CITED

The following references are of record in the file of this patent:

Cherbuliez et al., "Chemical Abstracts," vol. 25 (1931), p. 2132.

Ehrlich et al., "Science," vol. 106, Oct. 31, 1947.